United States Patent
Hajmohammadi et al.

(10) Patent No.: US 11,983,819 B2
(45) Date of Patent: May 14, 2024

(54) METHODS AND SYSTEMS FOR DEFORMING A 3D BODY MODEL BASED ON A 2D IMAGE OF AN ADORNED SUBJECT

(71) Applicant: Verizon Patent and Licensing Inc., Basking Ridge, NJ (US)

(72) Inventors: Solmaz Hajmohammadi, San Francisco, CA (US); Richard A. Paris, Nashville, TN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 190 days.

(21) Appl. No.: 17/824,211

(22) Filed: May 25, 2022

(65) Prior Publication Data
US 2023/0386135 A1 Nov. 30, 2023

(51) Int. Cl.
| | |
|---|---|
| *G06T 17/20* | (2006.01) |
| *G06T 13/40* | (2011.01) |
| *G06T 15/02* | (2011.01) |
| *G06T 15/04* | (2011.01) |
| *G06T 19/20* | (2011.01) |

(52) U.S. Cl.
CPC ............ *G06T 17/205* (2013.01); *G06T 13/40* (2013.01); *G06T 15/02* (2013.01); *G06T 15/04* (2013.01); *G06T 19/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 6,421,067 B1 * | 7/2002 | Kamen | H04N 21/4316 348/E5.103 |
| 7,184,047 B1 * | 2/2007 | Crampton | G06T 17/00 348/592 |
| 2005/0052452 A1 * | 3/2005 | Baumberg | G06T 7/564 345/419 |
| 2009/0154794 A1 * | 6/2009 | Kim | G06T 17/20 382/154 |
| 2009/0207168 A1 * | 8/2009 | Hattori | G06T 19/20 345/420 |
| 2009/0207171 A1 * | 8/2009 | Feilkas | G06T 19/00 345/427 |
| 2011/0069866 A1 * | 3/2011 | Kim | G06T 7/12 382/209 |
| 2014/0334670 A1 * | 11/2014 | Guigues | G06V 10/426 382/103 |

* cited by examiner

*Primary Examiner* — Jason A Pringle-Parker

(57) ABSTRACT

An illustrative 3D modeling system accesses 1) a 3D body model bounded by vertices forming an unadorned body (without hair or clothing), and 2) a 2D image depicting an adorned subject (with hair and/or clothing). The set of vertices is configurable to simulate different subjects based on a set of parameters and the adorned subject is outlined in the 2D image by a set of silhouette pixels. The 3D modeling system maps the silhouette pixels to vertices of a particular cross section of the 3D body model using an optimization function configured to even out a distribution of silhouette pixels to vertices. Based on the mapping, the 3D modeling system defines the set of parameters to deform the 3D body model such that the particular cross section conforms to an outline of the adorned subject formed by the set of silhouette pixels. Corresponding methods and systems are also disclosed.

20 Claims, 13 Drawing Sheets

METHODS AND SYSTEMS FOR DEFORMING A 3D BODY MODEL BASED ON A 2D IMAGE OF AN ADORNED SUBJECT

BACKGROUND INFORMATION

It is desirable to model three-dimensional (3D) subjects for a variety of entertainment, educational, occupational, promotional, and/or other applications and use cases. For example, by modeling 3D subjects such as people, furnishings, walls, floors, and ceilings in a real-world room, virtual reality content associated with the real-world room may be generated to provide a virtual reality experience to a user located somewhere other than the real-world room. As another example, 3D models of subjects such as human subjects, animal subjects, inanimate objects, or the like, may be used to provide an augmented reality experience for a user in which the 3D models are inserted as augmentations into the user's real-world environment to make it appear as if these subjects are present where they are not actually present. In still other applications, 3D models may be presented as part of social media applications, video games, movie special effects, educational materials, and so forth.

For any of these applications or use cases, it is desirable for the 3D modeling to be performed accurately so as to result in 3D models that represent subjects as realistically as possible. Such true-to-life 3D modeling may cause the applications leveraging the 3D models to be realistic, lifelike, immersive, and enjoyable for users experiencing the applications.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
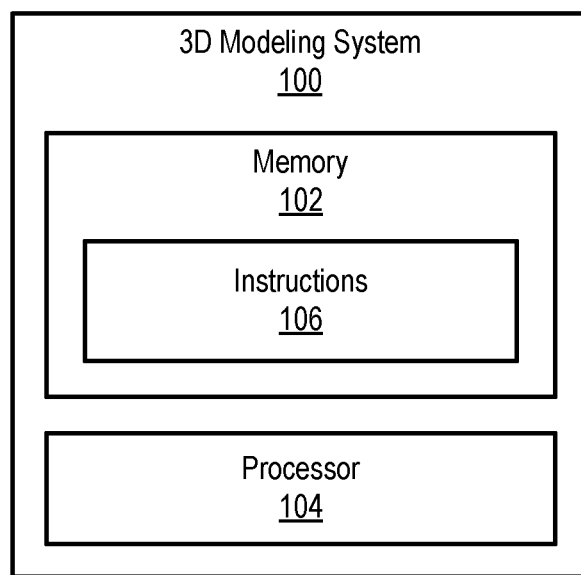
FIG. 1 shows an illustrative 3D modeling system configured to deform a 3D body model based on a 2D image of an adorned subject.

Methods and systems for deforming a three-dimensional (3D) body model based on a two-dimensional (2D) image of an adorned subject are described herein. Various approaches may be employed to generate 3D volumetric models of subjects (e.g., human subjects, animal subjects, etc.). In one example approach, data captured from various image capture devices (e.g., cameras) disposed at vantage points surrounding the subject that is to be modeled may be used to generate a model "from scratch." Specifically, based on color and depth data that is captured by these capture devices, the 3D model in this approach may be formed based on the geometry and appearance of the subject as observed from the vantage points around the subject.

In another example approach (e.g., an approach configured to be functional even with less image data and/or fewer image capture devices), a generic and parameterizable 3D body model may be used as a starting point in forming the final volumetric model of the subject. For instance, the 3D body model may be implemented as a 3D mesh bounded by a set of vertices that interconnect to form a shape of an unadorned body (i.e., a body of a human or other subject that lacks adornments such as hair and/or clothing). The set of vertices of the 3D body model may be configurable to simulate different subjects (e.g., different human subjects, different animal subjects of a particular animal type, etc.) based on a set of parameters that is defined for the 3D body model. For example, when the set of parameters are defined in one way, the 3D body model may simulate a tall person with a lean build, whereas, when the set of parameters are defined in another way, the 3D body model may simulate a shorter person with a more muscular build. Accordingly, in this second example approach for generating a volumetric model of a particular subject, one or more 2D images depicting the particular subject may be used as a basis for defining the set of body model parameters, and the final volumetric model of the subject may hence be based on the parameterized 3D body model (e.g., using parameters to cause the 3D body model to conform as nearly as possible to the subject based on the 2D images of the subject).

While it will be understood that this second approach may result in a volumetric model that may not be as accurate as a full-fledged model generated entirely from color and depth data captured from vantage points all around the subject, it will also be understood that this approach may be highly advantageous for various applications and/or circumstances since the modeling may be performed using significantly less data than might be required for the depth-data-based modeling approach. For example, even a single 2D image or a small number of images from a limited number of vantage points may be enough to generate a convincing volumetric model of a subject. Or, as another example, a full-body volumetric model may be generated even if available images of the subject only depict the subject from the waist up.

To generate a volumetric model by way of this latter approach, a suitable 3D body model may be deformed, based on parameters that have been selected and defined in the ways described herein, in a manner that causes the 3D body model to conform to whatever 2D images happen to be available that depict the subject to be modeled (which may consist of as few as one single image or which may consist of a large number of images depicting the subject from many angles). Whereas the generic 3D body model (prior to deformation) may be a mesh in the shape of an unadorned subject (i.e., a generic subject lacking hair, clothing, and other such adornments beyond the basic body parts and features shared universally by the large majority of all such subjects), the deformed 3D body model resulting from the parameterization may incorporate at least some adorning features of the subject such as hair and/or clothing. For instance, if the subject is a human subject with long hair and wearing a bulky coat, the deformed 3D body model may have a shape that reflects the hair and/or clothing (referred to herein as "adornments") of the subject such that the volumetric model generated based on the deformed 3D body model will simulate the adorned subject with the hair and/or coat in this example.

As will be described and illustrated in detail herein, part of the process of parameterizing a 3D body model may be to map silhouette pixels of the adorned subject as depicted in the 2D image (i.e., the pixels that outline the adorned subject in the 2D image) to particular vertices of the 3D body model. Based on these mappings, parameters may be defined in a manner that attempts to make each vertex of the 3D body model conform as closely as possible to one or more silhouette pixels to which it is mapped. Accordingly, the mapping of silhouette pixels to vertices of a 3D body model is an important step in ultimately achieving an optimal deformation of the 3D body model. Unfortunately, relatively simplistic algorithms for determining how the silhouette pixels and vertices are to be mapped may result in undesirable artifacts under common conditions such as will be described and illustrated below. As such, optimization functions described herein may be used to improve the mapping and parameterization operations to thereby avoid or reduce such issues. In this way, volumetric models that are ultimately generated and presented to represent subjects in the applications and use cases described herein may be efficient, effective, and accurate, and users may enjoy immersive and convincing presentations of 3D objects that accurately characterize the subjects they are meant to represent. For example, volumetric models of subjects generated in the ways described herein may be manipulated in various ways such as by being animated to perform certain behaviors (e.g., including behaviors that the subject may not have performed or may not be able or inclined to perform such as professional dance moves, action stunt moves, etc.), analyzed to determine characteristics of the subject (e.g., height, muscle size, approximate weight, etc.), or the like. Various useful animation, entertainment, educational, vocational, communication, and/or other applications and use cases may rely on such modeling in various ways described herein and/or as may be conceived by those of skill in the art.

Various specific implementations will now be described in detail with reference to the figures. It will be understood that the specific implementations described below are provided as non-limiting examples and may be applied in various situations. Additionally, it will be understood that other examples not explicitly described herein may also be captured by the scope of the claims set forth below. Methods and systems described herein for deforming a 3D body model based on a 2D image of an adorned subject may provide any of the benefits mentioned above, as well as various additional and/or alternative benefits that will be described and/or made apparent below.

FIG. 1 shows an illustrative 3D modeling system 100 ("system 100") configured to deform a 3D body model based on a 2D image of an adorned subject. System 100 may be implemented by computer resources such as processors, memory facilities, storage facilities, communication interfaces, and so forth. For example, as will be described in more detail below, system 100 may be partially or fully implemented within graphics presentation devices used by end users (e.g., user equipment (UE) devices, head-mounted or hand-held extended reality presentation devices, mobile devices such as smartphones or tablet devices, personal computers, or other equipment used directly by end users); by server-side, multi-access computing systems separate from the graphics presentation devices; by a combination of any of these; or by any other suitable computing systems as may serve a particular implementation. In some examples, at least part of system 100 may be implemented by distributed computing systems operated by a cellular data provider (e.g., multi-access edge compute (MEC) systems), distributed computing systems operated by a cloud-computing provider (e.g., multi-access cloud compute systems), or by other such distributed computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with deforming a 3D body model based on a 2D image of an adorned subject in accordance with methods and systems described herein and/or as may serve a particular implementation.

Figure 2:
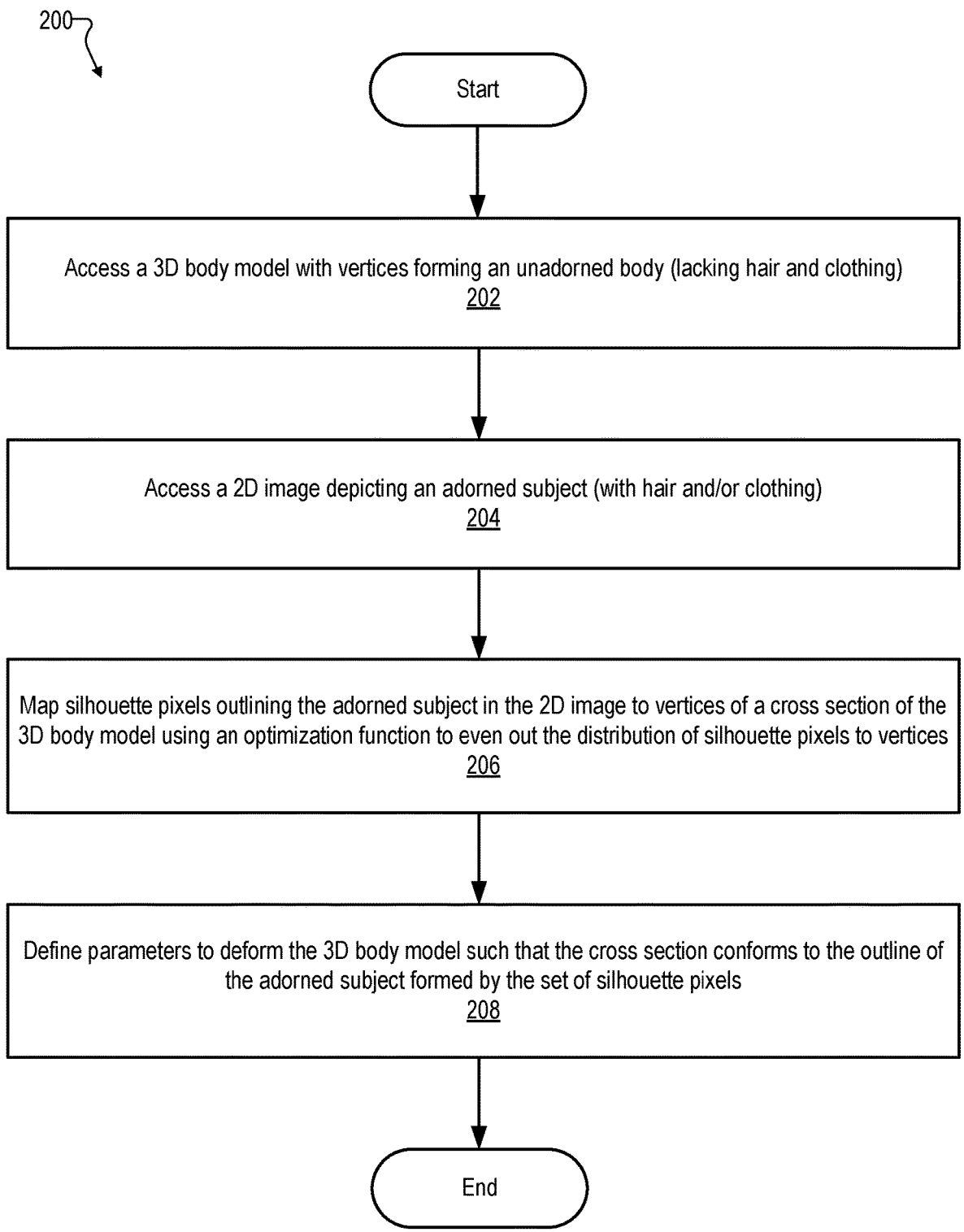
FIG. 2 shows an illustrative method for deforming a 3D body model based on a 2D image of an adorned subject.

As one example of functionality that processor 104 may perform, FIG. 2 shows an illustrative method 200 for deforming a 3D body model based on a 2D image of an adorned subject. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a 3D modeling system such as system 100 and/or any implementation thereof.

In certain examples, 3D modeling operations of method 200 may be performed efficiently and quickly, but, prioritizing the realism and quality of the resulting 3D models, may not necessarily be performed in real time. In other examples, 3D modeling operations of method 200 may be performed in real time so as to provide, receive, process, and/or use data described herein immediately as the data is generated, updated, changed, exchanged, or otherwise becomes available (e.g., generating parameters with which to deform the 3D body model of the subject as 2D video of the subject is being captured). Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by an implementation of system 100 (e.g., by processor 104 executing instructions 106 stored in memory 102).

At operation 202, system 100 may access a 3D body model. For example, the 3D body model may include or be implemented by a parameterizable mesh bounded by a set of vertices that interconnect to form a shape of an unadorned body (i.e., a body of a generic subject that lacks adornments such as hair and/or clothing). The unadorned body may be of a particular body type that matches the type of body the subject has. For instance, in many examples the subject to be modeled may be a human subject having a human body. In these examples, the shape of the unadorned body formed by the set of vertices of the 3D body model may hence be a basic shape of the human body (e.g., with typical body parts such as a head, neck, torso, arms, legs, etc.) without adornments such as hair, clothing, accessories, or the like. The set of vertices bounding the 3D body model may be configurable to simulate different subjects based on a set of parameters. For example, certain parameter values may cause the 3D body model to take the form of a person with thin or sparse clothing and short or no hair, while other parameter values may cause the 3D body model to take the form of the same size of person with thick or bulky clothing and long hair. As another example, different parameter values may cause characteristics such as height, build, weight, body proportions, and so forth to vary in accordance with characteristics of a particular subject (e.g., a particular person) that is being modeled.

It will be understood that the unadorned body modeled by the 3D body model may be of the same body type as the subject (i.e., both are human in this example, though both may be a particular type of animal or other subject type in other examples), but may not otherwise be customized or adapted to necessarily represent the individual subject in any particular way. For instance, in certain implementations, a same generic human 3D body model may be used to represent diverse human subjects including people of various genders, heights, builds, and so forth, as long as each of the subjects has the same typical body parts as the 3D body model. In other implementations, as will be described in more detail below, the 3D body model may be selected from a library of different (and perhaps less generic) 3D body models that represent more specific types of people (e.g., adults versus children, males versus females, tall people versus short people, etc.). A particular 3D body model template selected manually or automatically (e.g., based on the 2D image accessed at operation 204 as will be described below) may, even before being deformed, already roughly approximate the subject and thereby facilitate system 100 in achieving a high degree of conformance (i.e., a close fit) between one or more 2D image outlines and corresponding cross sections of the deformed 3D body model.

At operation 204, system 100 may access a 2D image depicting at least a portion of an adorned subject. That is, the subject depicted in the 2D image accessed at operation 204 may be outfitted, unlike the 3D body model accessed at operation 202, with adornments such as hair, clothing, or the like. In some examples, the 2D image may be a standalone still image (e.g., a photograph). In other examples, the 2D image may be a video frame from a sequence of frames of a video that depicts the portion of the adorned subject. In either case, the depiction of the adorned subject (or portion thereof, such as a depiction of the subject from the waist up, etc.) may be composed of pixels in the 2D image. When the portion of the adorned subject is identified and distinguished from other image content depicted in the image (e.g., by semantically segmenting the subject with his or her adornments from the other image content, as will be described below), the outer pixels of the segmented representation of the adorned subject may form an outline or silhouette of the adorned subject. These outer pixels will be referred to herein as "silhouette pixels," and, as will be illustrated and described in more detail below, the 2D image accessed at operation 204 may include a set of these silhouette pixels that can be used to define suitable parameters for deforming the 3D body model accessed at operation 202 to conform to the adorned subject as depicted in the 2D image.

At operation 206, system 100 may map the set of silhouette pixels outlining the adorned subject in the 2D image accessed at operation 204 to vertices (of the set of vertices forming the unadorned body) bounding a particular cross section of the 3D body model accessed at operation 202. For example, as will be illustrated and described in more detail below, silhouette pixels from each available 2D image of the adorned subject may be mapped to vertices in respective cross sections of the 3D body model in a surjective manner that guarantees that each silhouette pixel is mapped to exactly one particular vertex. In some examples, the mapping may be performed based on proximity of silhouette pixels to vertices when the silhouette pixel outline is overlaid onto the cross section of the 3D body model. Such a mapping function would be relatively easy and efficient to perform, but, as will be illustrated and described, may create issues when certain vertices, or even contiguous groups of vertices (e.g., in a concave region of the cross section) are not mapped to any silhouette pixel while other vertices are mapped to large numbers of silhouette pixels, thereby possibly creating undesirable artifacts. In other examples, this proximity between the silhouette pixels and vertices (referred to herein as the "ray length") may be accounted for together with other factors that help to avoid the undesirable artifacts mentioned above. For example, the mapping performed at operation 206 may include applying an optimization function configured to even out a distribution of silhouette pixels to vertices by mapping at least some of the set of silhouette pixels to non-proximate vertices in the set of vertices (i.e., vertices that are farther away, or have longer ray lengths, than other vertices that are closer to the silhouette pixels).

At operation 208, system 100 may define the set of parameters to deform the 3D body model such that the particular cross section conforms to the outline of the portion of the adorned subject formed by the set of silhouette pixels. For instance, the set of parameters may be analyzed (and hence ultimately defined and implemented) based on the mapping performed at operation 206. In some examples, a large number of 2D images depicting the adorned subject from a large number of different viewpoints (e.g., frames of a video depicting the adorned subject turning in a circle to present himself or herself from viewpoints 360 degrees around) may be analyzed in connection with a large number of corresponding cross sections of the 3D body model. As such, parameters may be defined such that, when the 3D body model is deformed (i.e., parameterized) using the selected parameter values, the silhouette pixels of all the different 2D images conform as closely as possible to their mapped vertices in all the respective cross sections of the 3D body model and the size and shape of the deformed 3D body model simulates (e.g., closely conforms to) the size and shape of the adorned subject as represented in the 2D images.

By using an optimized mapping (e.g., a mapping performed using optimization functions described herein) of silhouette pixels to vertices, system 100 may ensure that the mapping is useful and robust even in situations that tend to create undesirable artifacts when optimized mappings are not relied on. For example, the situation mentioned above in which certain curves of the 3D body model cross section are concave while corresponding curves of the adorned subject silhouette are convex (e.g., at the nape of the neck where the body model's neck may curve inward while the long hair or clothing of the adorned subject silhouette curves outward) may result in mappings being bunched at the top and bottom of the neck if the mappings are based only on ray lengths (i.e., raw proximity between silhouette pixels and vertices). This may in turn lead to distortions (e.g., unnatural bumps in these areas, etc.) when the parameters are defined and the deformation is performed.

By optimizing the mapping using an optimization function configured to even out the distribution of silhouette pixels to vertices, these types of distortions (or other such undesirable artifacts) may be avoided, as will be described and illustrated in more detail below. Accordingly, as used herein, a distribution may be "evened out" by making an attempt to more equally distribute the mappings across all the vertices, rather than allowing large numbers of silhouette pixels to be bunched up in the mapping to just a few key vertices. It will be understood that, even when suitable optimization functions are applied, it would not be expected that every vertex would be mapped to an equal number of silhouette pixels. Certain vertices may still tend to have larger numbers of assigned silhouette pixels than others based on the geometries of the inputs. But the evening out of the distribution may cause these numbers to be at least somewhat more equalized than they would be without the optimization function. For example, one or more silhouette pixels that would be mapped to a "proximate" vertex (i.e., the vertex that happens to be nearest to the silhouette pixels when the silhouette and cross section are overlaid) may, under the influence of the optimization function, instead be mapped to a "non-proximate" vertex (i.e., a vertex other than the one nearest to the silhouette pixels when the silhouette and cross section are overlaid).

Based on parameters defined at operation 208, additional operations may be performed by system 100 or by other systems or processes (e.g., systems or processes operating in parallel to system 100). For example, such additional operations may include, without limitation, deforming the 3D body model based on the defined parameters, using that deformed 3D body model to generate a volumetric model of the adorned subject, manipulating that volumetric model of the adorned subject, presenting the volumetric model or data derived therefrom, and so forth. In connection with these additional operations (and as will be described in more detail below), the volumetric model of the adorned subject may be used in any suitable application or use case (e.g., as an avatar in a game, extended reality application, social communication application, or the like). In certain use cases, for instance, the volumetric model of the adorned subject may be used to create an animation. For example, system 100 may animate, based on an animation of an additional subject different from the modeled subject, the volumetric model of the adorned subject to mimic the animation of the additional subject. In this way, if the additional subject performs a dance or a stunt or other action that the adorned subject being modeled has not performed (e.g., is not able or willing to perform, etc.), the volumetric model of the adorned subject may be made to perform the action (i.e., the dance, stunt, etc.) based on the actions of the additional subject and without the adorned subject having to perform the action himself or herself.

Figure 3:
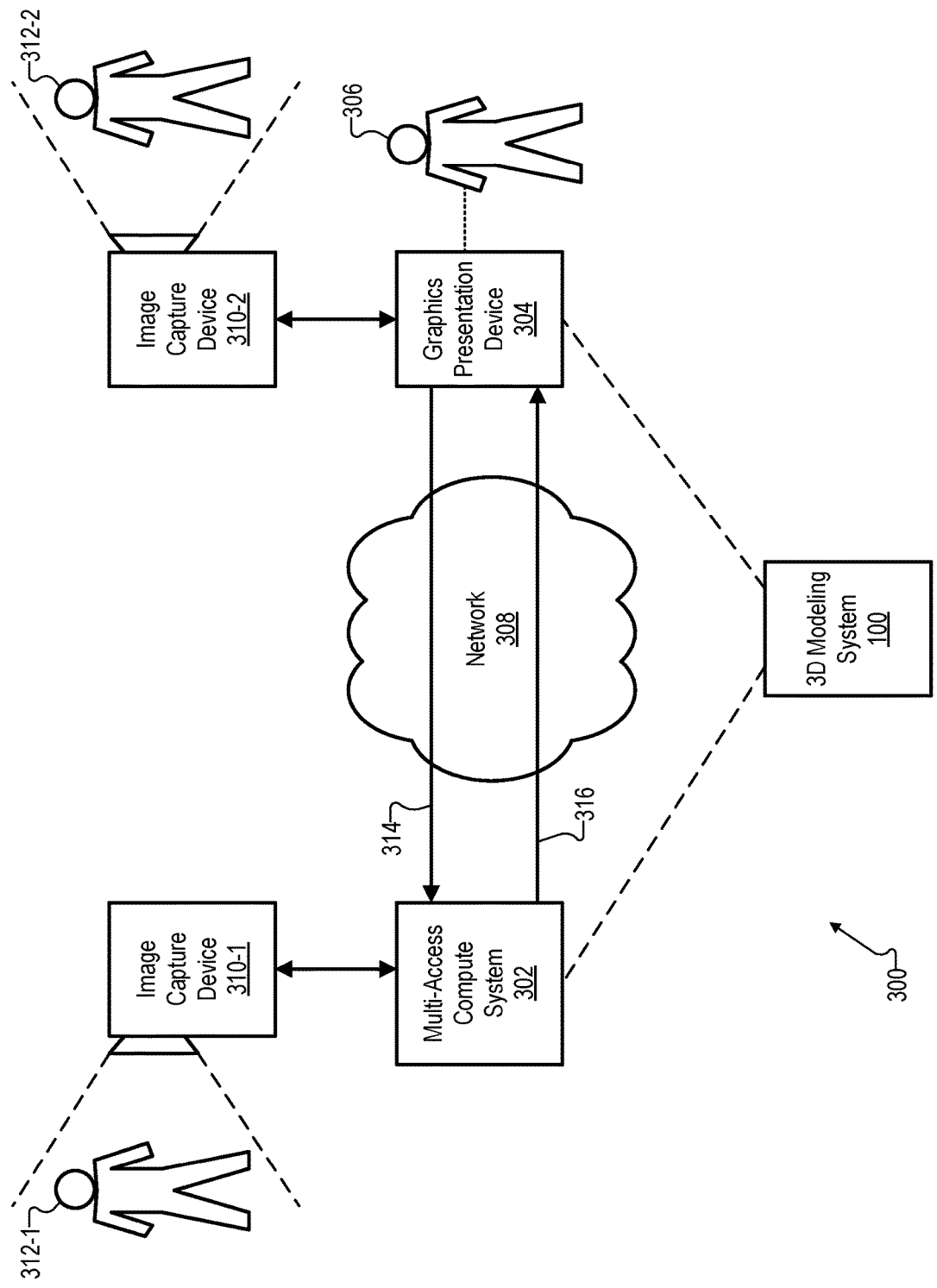
FIG. 3 shows an illustrative configuration in which a 3D modeling system may be deployed.

FIG. 3 shows an illustrative configuration 300 in which 3D modeling system 100 may be deployed. For example, as illustrated with dashed lines in configuration 300, system 100 may be implemented by a multi-access compute system 302, a graphics presentation device 304 operated by a user 306 (e.g., an end user), or by a combination of one or more of these devices and/or other suitable devices (not explicitly shown in FIG. 3). As shown in FIG. 3, a network 308 may provide a communicative fabric by way of which various computing systems and devices (e.g., including whichever devices implement part or all of system 100) may intercommunicate and interoperate with one another. For example, multi-access compute system 302 and graphics presentation device 304 are shown to be communicatively coupled to one another by way of network 308 in configuration 300.

Multi-access compute system 302 may represent any computing system accessible by network 308 and configured to provide computing services to a plurality of client devices such as graphics presentation device 304. In certain examples, multi-access compute system 302 may be implemented by a multi-access edge compute (MEC) system provided and maintained by a data services provider such as a wireless carrier managing a provider network incorporated within network 308. In other examples, multi-access compute system 302 may be implemented by a multi-access cloud compute system and/or another distributed computing system as may be implemented within network 308 or as may be communicatively coupled to network 308 in a particular implementation.

In implementations in which system 100 is implemented by multi-access compute system 302, one or more 2D images may be captured and provided to system 100 by an image capture device 310-1 communicatively coupled to multi-access compute system 302. Such 2D images may depict any of various scenes, objects, and/or other subjects, including a human subject 312-1 (e.g., an adorned subject). Image capture device 310-1 may be implemented by any suitable image capture device such as a still camera, a video camera, a set of cameras pre-arranged to capture a scene in which human subject 312-1 is present, or the like. In these implementations, a communication 314 from graphics presentation device 304 to multi-access compute system 302 may represent a request for data, such as a request for a volumetric or other 3D model of human subject 312-1 or a request for content (e.g., extended reality content, 3D video content, etc.) that incorporates a volumetric or other 3D model of human subject 312-1 that is generated by the implementation of system 100 implemented by multi-access compute system 302. A communication 316 from multi-access compute system 302 to graphics presentation device 304 may then represent the response to that request, and may include data representative of the requested 3D model or content. In certain examples, rather than capturing the 2D imagery using image capture device 310-1, multi-access compute system 302 may receive one or more 2D images from graphics presentation device 304 (e.g., as part of communication 314) and may generate the 3D model and/or requested content based on those one or more 2D images received from graphics presentation device 304.

Graphics presentation device 304 may be implemented by any suitable device used by user 306 to view graphics such as a rendering of a 3D model of a human subject and/or other subjects (e.g., other human subjects, objects at the scene, etc.). For example, as mentioned above, in implementations in which system 100 is implemented by multi-access compute system 302, graphics presentation device 304 may request a volumetric model of an adorned subject (or content incorporating such a model) by way of communication 314 and may receive data representing the volumetric model by way of communication 316. In other implementations in which system 100 is implemented by graphics presentation device 304 itself, graphics presentation device 304 may receive a 2D image from an image capture device 310-2 (e.g., an integrated capture device built into graphics presentation device 304 such as a smartphone camera, a local capture device communicatively coupled to graphics presentation device 304 such as a video camera connected to a laptop computer, etc.) that captures the 2D image depicting a human subject 312-2 (e.g., another adorned subject). The implementation of system 100 implemented by graphics presentation device 304 may generate a volumetric model of human subject 312-2 in these examples with or without assistance from multi-access compute system 302. In certain such implementations, graphics presentation device 304 may operate in a standalone fashion, unconnected from network 308 and any multi-access compute system such as multi-access compute system 302.

Graphics presentation device 304 may present graphics such as volumetric models described herein from arbitrary viewpoints selected by user 306. To this end, graphics presentation device 304 may be implemented by various types of devices that are capable of displaying graphical imagery to users. For instance, graphics presentation device 304 could be implemented as (or included within) a computing system such as a mobile device (e.g., a smartphone, a tablet computing device, etc.), a dedicated virtual reality or augmented reality presentation device (e.g., a head-mounted device configured to display graphics directly in front of each eye of user 306), a portable or stationary computing device (e.g., a personal desktop or laptop computer, etc.), a television device, or any other system or device as may serve a particular implementation. In some examples, graphics presentation device 304 may include one or more display screens (e.g., traditional display screens, partially transparent heads-up display (HUD) screens, computer monitors, etc.) configured to display frames rendered by graphics presentation device 304 itself or by server-side systems such as multi-access compute system 302.

User 306 may represent any person who views graphical representations presented by graphics presentation device 304, and will be understood to typically have at least some degree of control over what graphics presentation device 304 displays. For example, if graphics presentation device 304 is implemented as an augmented or virtual reality presentation device, user 306 may move graphics presentation device 304 with respect to a virtual scene being presented and may, in this way, control the viewpoint from which the virtual or augmented reality experience is provided. User 306 is illustrated as a separate person from human subject 312-2 and, in some examples, may indeed be separate and distinct from the human subject being captured by image capture device 310-2 to be modeled by system 100. For instance, a user of a smartphone device (implementing graphics presentation device 304) that includes an integrated camera (implementing image capture device 310-2) may use the smartphone camera to capture images of a friend (human subject 312-2) that is to be modeled by an implementation of system 100 integrated with either graphics presentation device 304 or multi-access compute system 302 (or distributed between these two computing devices). In other examples, user 306 may actually be the same as human subject 312-2. For instance, user 306 may use the smartphone described above to take a selfie image that is used as the 2D image on which the volumetric model is based.

Network 308 may be implemented by any suitable private or public networks as may serve a particular implementation. For instance, part of network 308 may be implemented by a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). The provider of such a provider network may own or control all of the elements necessary to sell and deliver communications services between multi-access compute system 302, one or more graphics presentation devices 304 (only one of which is explicitly shown in configuration 300), and/or other computing devices connected to the network. Such communications services may include radio spectrum allocation, wireless network infrastructure, provisioning of devices, network repair, and so forth.

In some examples, other networks not controlled by the provider may also be included within network 308. For example, external network infrastructure may include the Internet, one or more wide area networks or local area networks to which graphics presentation device 304 is connected, a content delivery network, and/or any other suitable network or networks managed by any third parties outside of the control of the provider of the provider system described above. The network elements associated with network 308 may implement or employ any suitable communication technologies, devices, media, protocols, or the like as may serve a particular implementation.

Communications 314 and 316 between multi-access compute system 302 and graphics presentation device 304 may represent any communications of requests, responses, 2D images, 3D models, and/or other suitable data as may be useful to communicate in a given implementation (e.g., based on whether system 100 is implemented within multi-access compute system 302, within graphics presentation device 304, within both of these, etc.). As one possibility mentioned above, for instance, communication 314 may include a request for 3D content and communication 316 may include a volumetric model of human subject 312-1 that is generated based on 2D images captured by image capture device 310-1. Another possibility is that communication 314 may include, along with a request for 3D content, one or more 2D images (e.g., a 2D video, several snapshots, etc.) that is to be used as a basis for the volumetric model to be provided by way of communication 316. For instance, the 2D image may depict human subject 312-2 as captured by image capture device 310-2, and the volumetric model may be returned as a standalone model or as part of other 3D content (e.g., a virtual reality world featuring a 3D representation of human subject 312-2, etc.). As yet another possibility, graphics presentation device 304 (and an instance of system 100 implemented therein) may generate a volumetric model (e.g., of human subject 312-2 as captured by image capture device 310-2, etc.) such that communication 314 may include the volumetric model itself. In this example, then, communication 316 may include other 3D content that features the volumetric model (e.g., extended reality content featuring the volumetric model, a 3D world associated with video game or movie content featuring the volumetric model, etc.) along with, in some cases, other volumetric models (e.g., models received from other graphics presentation devices 304 not explicitly shown in configuration 300, etc.). These specific instances of possible communications 314 and 316 are to be regarded as illustrative examples only and are not to be understood to limit the ways in which 3D modeling may be performed or the various applications for 3D models (e.g., volumetric models) may be used.

Figure 4:
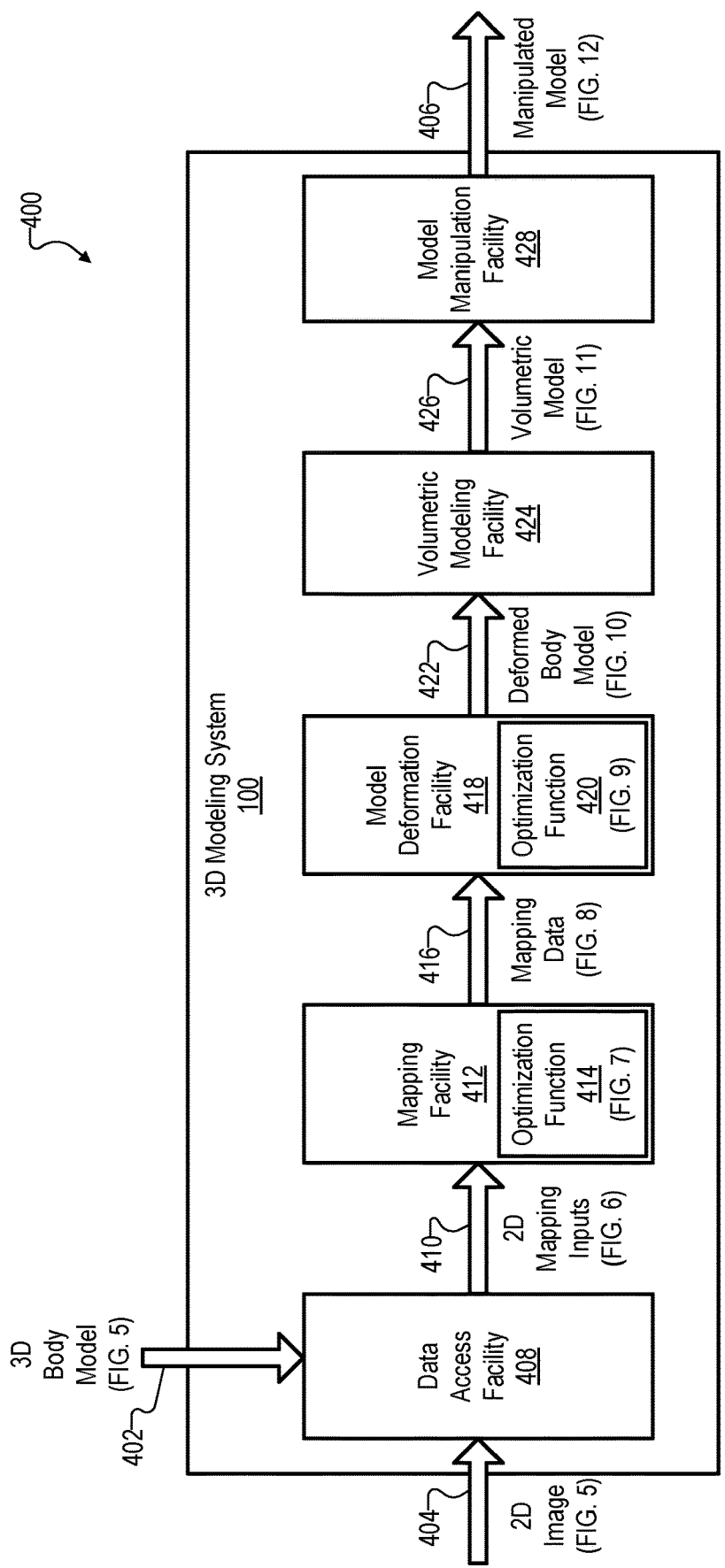
FIG. 4 shows illustrative facilities implemented by an example implementation of a 3D modeling system.

FIG. 4 shows an illustrative implementation 400 of 3D modeling system 100. As shown, implementation 400 includes various illustrative facilities that are configured, collectively, to perform the 3D modeling of an adorned subject based on one or more 2D images, including performing operations of method 200 and/or other operations described herein. The facilities of implementation 400 of system 100 will be understood to be implemented by computer hardware and software resources in any suitable way. For instance, each facility may represent software executing on a shared processor (e.g., an implementation of processor 104 that executes software associated with all of the facilities) to perform the operations described to be performed by that facility. As another example, each facility may be performed by a separate processor or even a separate computing system (e.g., a separate server, container, etc., in a multi-access computing environment).

Collectively, the facilities of implementation 400 are shown to form a pipeline in which data representative of a 3D body model 402 and data representative of a 2D image 404 (i.e., one or more still images or video frame sequence) are received as input to the 3D modeling system, each internal facility receives and processes input data and provides output data to the subsequent facility, and a manipulated (e.g., animated, analyzed, etc.) volumetric model 406 is ultimately provided by the 3D modeling system as output (e.g., for graphical presentation by a device such as graphics presentation device 304 in any of the applications described herein). More specifically, as shown, a data access facility 408 may receive 3D body model 402 and 2D image 404 and, based on this data, may generate 2D mapping inputs 410 to be received and processed by a mapping facility 412 using an optimization function 414. A set of mapping data 416 produced by mapping facility 412 is received by a model deformation facility 418 that uses an optimization function 420 to generate a deformed body model 422. The deformed body model is received as input to a volumetric modeling facility 424, which generates a volumetric model 426 that is manipulated by a model manipulation facility 428 to finally produce the manipulated model 406 described above, which may be output from the pipeline for use elsewhere (e.g., for presentation by system 100 or a presentation system in communication with system 100). It will be understood that the 3D modeling pipeline illustrated in implementation 400 of system 100 may be performed by any suitable computing resources as may serve a particular implementation. In some examples, some or all of the facilities of implementation 400 may be assisted with GPU acceleration for fast processing or other such enhancements.

Each of the facilities and datasets produced by the pipeline shown in FIG. 4 will now be described in more detail with reference to FIG. 4, as well as with reference to FIGS. 5-12, as indicated by parenthetical notations in FIG. 4. Specifically, for example, 3D body model 402 and 2D image 404 will be described with reference to FIG. 5, 2D mapping inputs 410 generated by data access facility 408 will be described with reference to FIG. 6, certain aspects of the optimization function 414 operating in mapping facility 412 will be described with reference to FIG. 7, mapping data 416 produced by mapping facility 412 will be described with reference to FIG. 8, certain aspects of the optimization function 420 operating in model deformation facility 418 will be described with reference to FIG. 9, outlines of certain cross sections of deformed body model 422 will be described with reference to FIG. 10, an implementation of a volumetric model 426 produced by volumetric modeling facility 424 will be described with reference to FIG. 11, and an implementation of a manipulated model 406 output from model manipulation facility 428 will be described with reference to FIG. 12.

Figure 5:
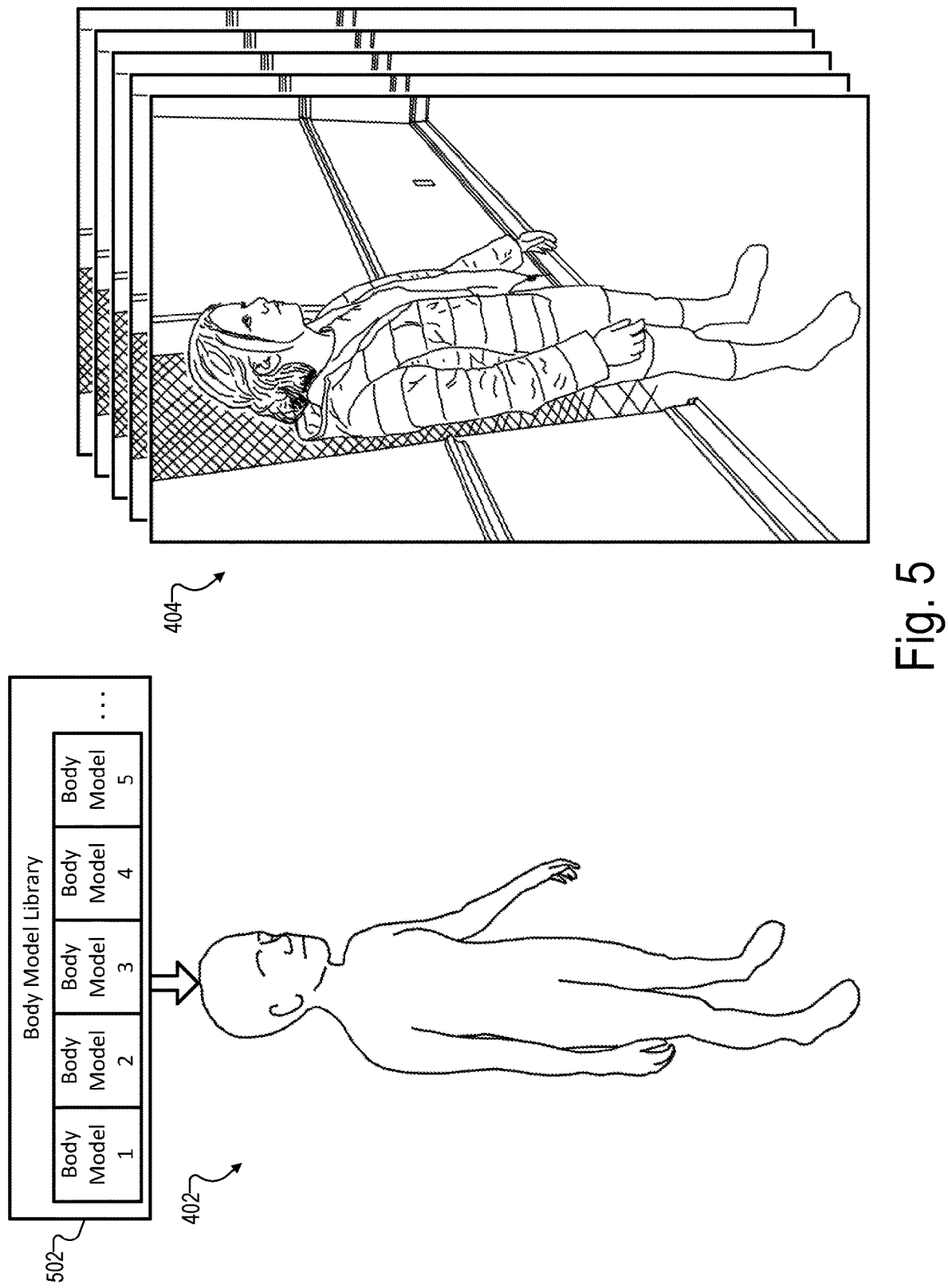
FIG. 5 shows an illustrative 3D body model selected from a body model library and a 2D image implemented as a video frame from a video depicting an adorned subject.

FIG. 5 shows an illustrative implementation of 3D body model 402 (which is selected from a body model library 502) as well as illustrative 2D imagery that includes an illustrative implementation of a 2D image 404 depicting an adorned subject (in this example, a video frame from a video depicting a human subject who has long hair and is wearing a relatively bulky coat).

3D body model 402 may be implemented by a generic mesh structure or other suitable model that is parameterizable to take on a variety of more specific forms (e.g., forms of a variety of specific adorned subjects such as the human subject depicted in 2D image 404). For example, 3D body model 402 may be bounded by a set of vertices that interconnect to form a shape of an unadorned body lacking hair and clothing, where this set of vertices is configurable to simulate different subjects based on values assigned to a set of parameters that defines the size, shape, and other characteristics of the body model. While specific vertices are not explicitly drawn in FIG. 5 (it will be understood that a large number of vertices may be present which could be difficult to individuate at the scale of this drawing), 3D body model 402 is shown to have a basic human form (e.g., including typical human body parts such as a head, torso, arms and hands, legs and feet, basic facial features and ears, etc.) but to be relatively generic (i.e., not taking the form yet of any specific individual). It will be understood that, once parameter values are determined and implemented for the set of parameters that define 3D body model 402, the body model may be deformed to simulate or conform to (i.e., approximate, imitate, look like, etc.) a specific individual such as the adorned human subject depicted in 2D image 404.

As mentioned above, in some implementations, a parameterizable 3D body model may be so flexibly customizable as to be able to conform to the size and shape of virtually any individual subject. Such a universal 3D body model, parameterized properly, could for example be the basis of a volumetric model for a child or an adult, a man or a woman, a person with long or short hair, a person with form-fitting or bulky clothing, and so forth. While this degree of flexibility may be possible, a large and complex set of definable parameters may be needed to implement such a model. Accordingly, in other implementations, a variety of different 3D body models may be made available to provide a variety of different starting points for deforming the model to conform to a specific individual. For example, different 3D body models may be available for children and adults, men and women, people with long hair and short hair, people with different types of clothing, people wearing shoes and not wearing shoes, and so forth. In these implementations, system 100 may perform the accessing of 3D body model 402 by selecting 3D body model 402 from a plurality of available body model templates such as illustrated in body model library 502.

As shown, body model library 502 may include a variety of body model templates labeled "Body Model 1," "Body Model 2," and so forth. Each of these body model templates may provide a good starting point for a particular type of subject (e.g., a human subject, different types of animal subjects, etc.) or, within a given subject type such as human subjects, the body model templates may provide starting points for particular types of bodies (e.g., a child body, an adult body, a man's body, a woman's body, etc.). System 100 may select one of the body model templates to use as 3D body model 402 based on any factors as may serve a particular implementation. For instance, in certain implementations, this selecting may be performed based on user input (e.g., the user indicates that they are an adult man with short hair, of that they are a teenaged girl of a particular height and weight, etc.). As another example, the selecting of a particular body model template may be performed more automatically (e.g., without requesting specific user input) based on the 2D image input (e.g., 2D image 404), which system 100 may analyze using machine learning or other suitable techniques to determine which body model template will provide the best starting point for the volumetric model that is to be produced. For example, based on the 2D image 404 shown in FIG. 5, system 100 may determine that the subject is a teenaged girl having a slender build and long hair but wearing bulky clothing and may select an appropriate body model template from body model library 502 to use as 3D body model 402.

2D imagery received as input to system 100, including the particular 2D image 404 shown as an example in FIG. 5, may be implemented by any suitable imagery that depicts an adorned subject (e.g., a human or animal subject that has hair, clothing, and/or other adornments) that is to be modeled by way of methods and systems described herein. For example, in certain cases, the 2D imagery incorporating 2D image 404 may be a photograph that depicts a person (e.g., a profile shot, a group photo, etc.) and that is either captured using an image capture device or is otherwise obtained (e.g., from an image database, from the Internet, etc.). In other cases, the 2D imagery received by system 100 may be a frame sequence (e.g., a video clip). For instance, the 2D image 404 may be a particular video frame from a video depicting the adorned subject rotating (e.g., turning around in front of the camera) to present a variety of viewpoints of the adorned subject. In such examples, system 100 may perform method 200 for the 2D imagery as part of a continuous process in which method 200 is being performed for many or all of the video frames of the video (e.g., for every image of the image sequence). For example, along with performing method 200 for a first video frame (e.g., 2D image 404), system 100 may also access additional video frames of the video (where the additional video frames depict the adorned subject from the variety of viewpoints), and map respective sets of silhouette pixels from the additional video frames to the vertices of the set of vertices of 3D body model 402 based on the optimization function. The defining of the set of parameters in such examples may then further be based (along with the mapping of the silhouette pixels of the first video frame to corresponding vertices) on the mapping of the respective sets of silhouette pixels from the additional video frames to the vertices. In some examples, rather than (or in addition to) capturing 2D imagery depicting the adorned subject from the various vantage points as the subject rotates over a period of time, a plurality of cameras located at different spatial locations may be used to capture the imagery at the different viewpoints.

While the representation of 2D image 404 illustrated in FIG. 5 shows a 2D image that is included in a sequence of similar images, it will be understood that 2D image 404 may represent any image, image sequence, video frames, video clip, or other suitable representation of 2D imagery described herein or as may serve a particular implementation. Additionally, while 2D image 404 shows a full body depiction of the adorned subject, it will be understood that available 2D imagery in certain examples may depict only a portion of an adorned subject (e.g., from the waist up, from the shoulders or neck up, etc.). While there would, of course, be less information in this case with which to accurately characterize the non-depicted portions of the adorned subject (and with which to deform the corresponding portions of the 3D body model), certain implementations of system 100 may nonetheless be configured to define parameters, deform the 3D body model, and generate a partial or full volumetric model of the adorned subject with as much accuracy as possible given whatever input information happens to be available.

Returning to FIG. 4, data access facility 408 is illustrated within implementation 400 of system 100 to receive 3D body model 402 and 2D image 404 and to provide them (or a modified version of them) as 2D mapping inputs 410 to mapping facility 412. Accordingly, data access facility 408 may incorporate any communication interfaces used by system 100 to communicate with users and/or other systems that provide the input data. For example, data access facility 408 may include network communication interfaces to communicate with storage facilities, image capture devices (e.g., cameras, etc.), or other suitable systems that may provide 3D body models and/or 2D imagery that is to be used as 2D image 404. Additionally or alternatively, data access facility 408 may implement one or more user interfaces to facilitate a user in capturing, creating, and/or selecting 2D imagery and/or 3D body models that are to be used.

Figure 6:
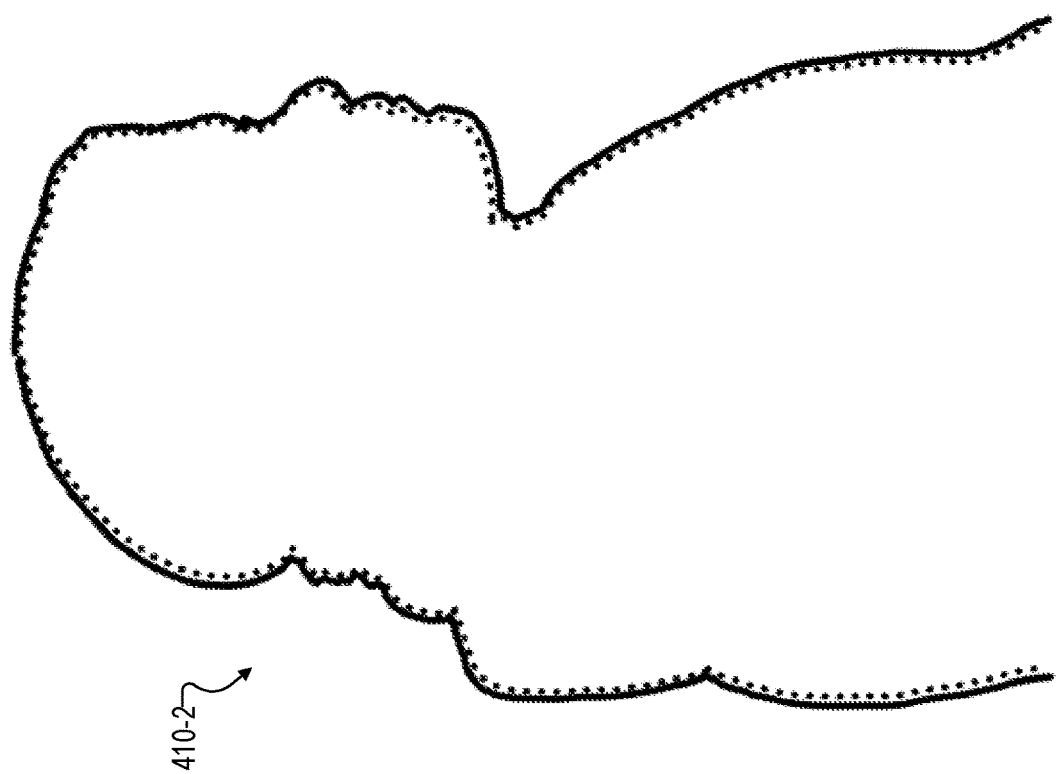
FIG. 6 shows illustrative 2D mapping inputs including a cross section of a 3D body model and a set of silhouette pixels outlining an adorned subject.
Figure 6:
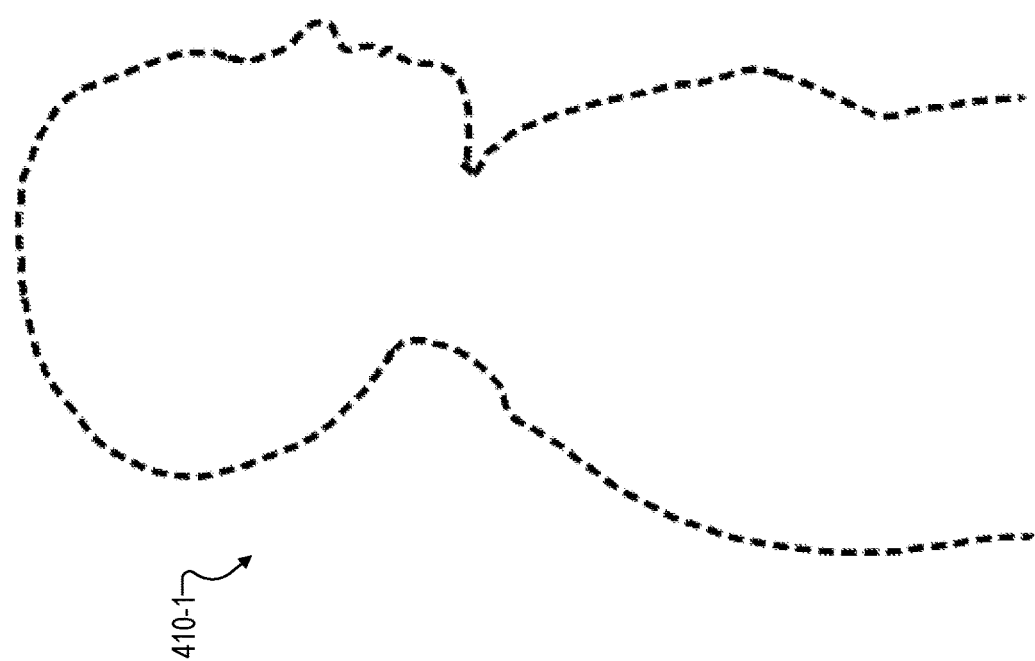

2D mapping inputs 410 may be based on 3D body model 402 and/or 2D image 404, but may be further processed and prepared for analysis by mapping facility 412 in ways that are illustrated, for example, in FIG. 6.

As shown, FIG. 6 illustrates example 2D mapping inputs 410 including a cross section of 3D body model 402 and a set of silhouette pixels outlining the adorned subject depicted in 2D image 404. More particularly, a first 2D mapping input labeled 410-1 shows a portion (e.g., from approximately the torso up) of a particular cross section (e.g., a profile cross section in this example) of 3D body model 402. This cross section is illustrated with a dashed-line outline of the cross section that will be referred to hereafter as "cross section 410-1." While specific vertices of the set of vertices bounding 3D body model 402 are not illustrated in FIG. 6 per se, it may be assumed for purposes of later illustrations (e.g., FIG. 8) that vertices are present all along cross section 410-1 (e.g., approximately one vertex disposed on every other dash of the dashed line). While only the top portion of this cross section is illustrated in FIG. 6 and other figures described below for illustrative clarity, it will be understood that either a partial of full cross section may be provided by data access facility 408 and analyzed by mapping facility 412 in certain implementations.

Also shown in FIG. 6 is a second 2D mapping input, labeled 410-2, which shows a corresponding (torso-up) portion of an outline of the adorned subject depicted in 2D image 404. This outline is illustrated with a solid line punctuated by a dotted line that incorporates a number of dots that will be understood to represent individual silhouette pixels outlining the segmented depiction of the adorned subject within 2D image 404. This outline of silhouette pixels will hereafter be referred to alternatively as "outline 410-2" or as the set of "silhouette pixels 410-2." Similarly as described above in relation to cross section 410-1, it will be understood that, while only the top portion of the adorned subject outline is illustrated in FIG. 6 and other figures described below for illustrative clarity, either a partial or full outline of the adorned subject may be provided by data access facility 408 and analyzed by mapping facility 412 in certain implementations.

Data access facility 408 may perform any suitable functions to prepare 2D mapping inputs 410 (e.g., one or more cross sections such as cross section 410-1 and/or one or more sets of silhouette pixels such as silhouette pixels 410-2) for processing by mapping facility 412. For example, for each 2D image that data access facility 408 receives (e.g., assuming that a plurality of 2D images, such as a 2D video sequence or the like, is received) data access facility 408 may perform semantic segmentation operations to distinguish the depiction of the adorned subject within the 2D image from depictions of other subject matter in the 2D image (e.g., other subjects, background scenery, etc.). Based on the semantically segmented depiction of the adorned subject, data access facility 408 may generate outline 410-2 based on the outermost pixels (i.e., the silhouette pixels) of the segmented depiction. Data access facility 408 may also determine which cross section of 3D body model 402 most nearly corresponds to the viewpoint of the adorned subject captured in the 2D image. For instance, as shown in this example, since the adorned subject is captured in profile looking to the right in this particular 2D image 404, the most relevant cross section of 3D body model 402 to be provided as cross section 410-1 is a cross section of the body model in profile looking to the right.

Returning to FIG. 4, 2D mapping inputs 410 are shown to be provided to mapping facility 412, which, by applying optimization function 414, is configured to produce mapping data 416 that is provided to model deformation facility 418 (where 3D body model 402 will actually be parameterized and deformed to simulate the adorned subject depicted in 2D image 404). As will now be described, the generating of mapping data 416 thus involves mapping (e.g., assigning) each silhouette pixel of a set of silhouette pixels (such as makes up outline 410-2) to a particular vertex of a set of vertices (such as bound cross section 410-1 of 3D body model 402). Once the silhouette pixels and vertices are mapped together in this way, parameters may be adjusted and refined (e.g., using optimization techniques, machine learning technologies, etc.) with an aim to make each vertex of the deformed 3D body model conform as closely as possible to the silhouette pixel(s) mapped thereto. Conceptually, as will be illustrated and explained in more detail below, one may imagine an outline of silhouette pixels overlaid onto a cross section of vertices and the silhouette pixels may be imagined to "pull" the vertices to which they are mapped outward or inward towards the silhouette pixels as the parameters for the 3D body model are selected and refined. Ultimately, when the parameters are such that each vertex suitably conforms with the silhouette pixels mapped thereto, the deformed 3D body model will appear similar in size and shape to the adorned subject as depicted in the one or more 2D images upon which the mapping and deforming were based.

Due to the way that the mappings will ultimately affect the resulting deformation of the 3D body model, mapping facility 412 may be configured to map silhouette pixels to vertices in a manner that will cause the resulting deformation to simulate the adorned subject (as depicted in the 2D imagery) as accurately as possible and to minimize undesirable artifacts that may result from suboptimal mappings. The application of optimization function 414 to prospective mappings as mapping facility 412 generates mapping data 416 may help ensure that mappings are optimized and avoid the undesirable artifacts wherever possible. For example, optimization function 414 may implement "penalties" and/or "incentives" to help assess objective scores for various prospective mappings that could be selected. While there may not be any single "right" way to map each silhouette pixel (particularly given the various dimensions along which the optimality of mappings may be judged), applying an optimization function 414 that penalizes certain aspects of certain prospective mappings (and thereby incentives opposite aspects present in other prospective mappings) helps ensure that optimal mappings are ultimately selected and used. For example, prospective mappings may be objectively scored, assessed, selected, and optimized based on optimization function 414 to ensure that mapping data 416 output from mapping facility 412 will form a reliable basis for effective and accurate model deformation at the following stage (by model deformation facility 418).

Figure 7:
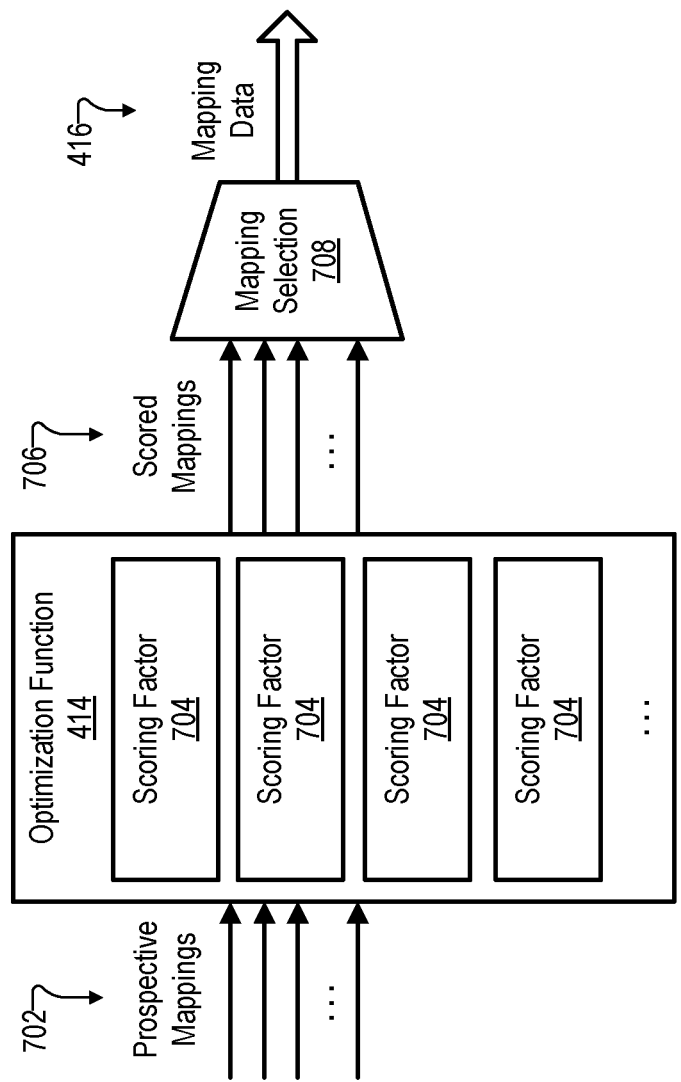
FIG. 7 shows illustrative aspects of how an optimization function may be used to map silhouette pixels outlining an adorned subject to vertices bounding a cross section of a 3D body model.
Figure 8:
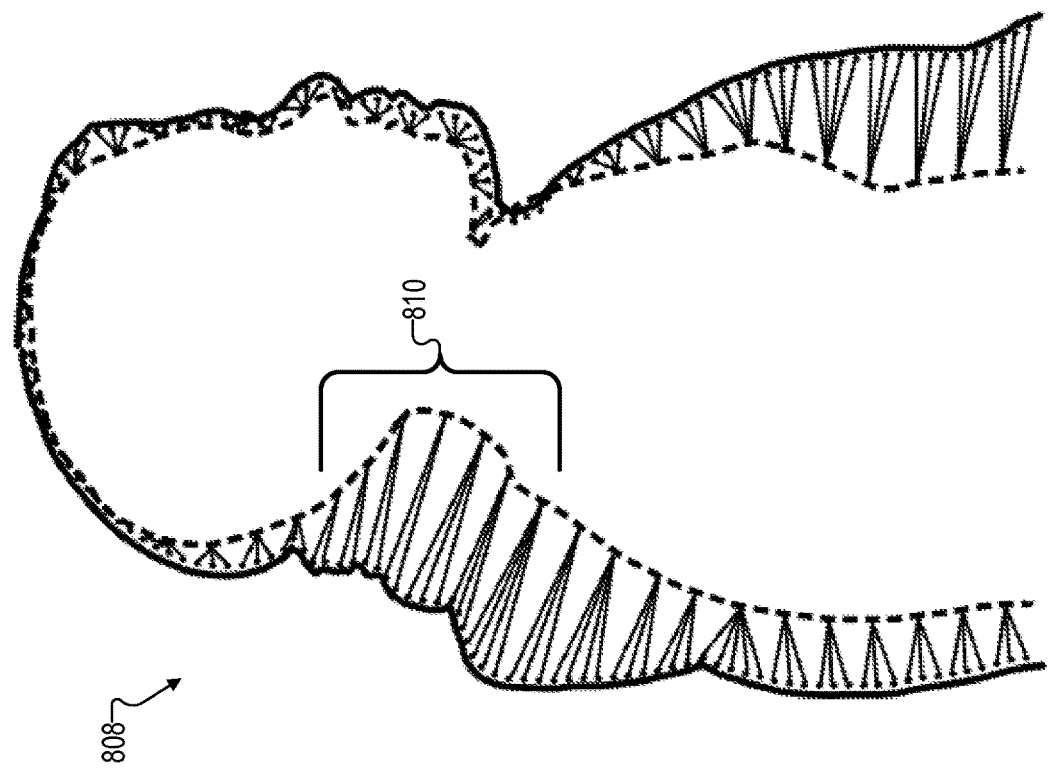
FIG. 8 shows illustrative mappings of silhouette pixels to vertices and how the mappings are influenced by the use of the illustrative optimization function of FIG. 7.
Figure 8:
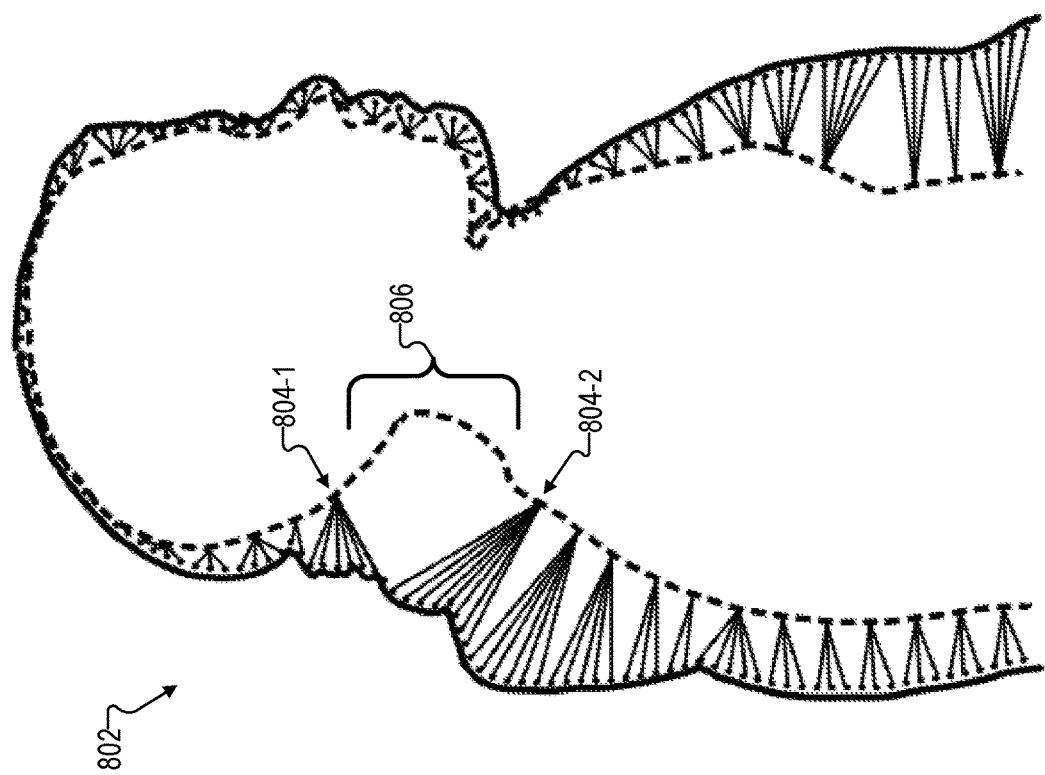

To illustrate how mapping facility 412 may apply optimization function 414 to generate high-quality mapping data 416 (i.e., data representative of optimized mappings of silhouette pixels to vertices), FIG. 7 shows illustrative aspects of how optimization function 414 may be used to map silhouette pixels from outline 410-2 of the adorned subject to vertices of cross section 410-1 of 3D body model 402. FIG. 8 then shows various illustrative mappings of the silhouette pixels to the vertices and how the resulting mappings may be influenced by the use of optimization function 414. More particularly, as shown in FIG. 8 and as will be described in more detail below, lines connecting silhouette pixels along the outline to vertices along the cross section (as the outline is overlaid onto or around the cross section) will be understood to represent mappings from the silhouette pixels to the vertices (i.e., less optimal mappings on the left and more optimal mappings on the right, as will be described).

In FIG. 7, optimization function 414 is shown to assess various prospective mappings 702 using a variety of scoring factors 704 to determine scored (i.e., assessed, weighted, etc.) versions of each of the prospective mappings, referred to as scored mappings 706. Based on the assessments incorporated into scored mappings 706, a mapping selection 708 generates mapping data 416, which may indicate, for each silhouette pixel, a particular vertex of the cross section (i.e., data representative of each of the connecting lines illustrated in FIG. 8). Accordingly, as will be illustrated in FIG. 8, the mappings handled by mapping facility 412 (and by the optimization function 414 implemented therein) may represent a surjective function from the silhouette pixels of the outline (e.g., outline 410-2, which may be the domain of this surjective function), to the vertices of the cross section (e.g., cross section 410-1, which may be the codomain of this surjective function). While simplistic mapping techniques (e.g., assigning each silhouette pixel to its most proximate vertex without other considerations) may result in many silhouette pixels being mapped to a relatively small number of vertices (while other vertices may not be mapped to any silhouette pixels), optimization function 414 may help even out the distribution of silhouette pixels to vertices by mapping at least some of the silhouette pixels to non-proximate vertices (i.e., vertices other than those to which they are most proximate) due to factors other than proximity that are factored into the mapping. It will be understood that various aspects illustrated in FIG. 7 are presented to facilitate conceptual understanding of the role that optimization function 414 may play, and, as such, FIG. 7 does not show the mathematical and computational aspects that may characterize optimization function 414 in operation as the function optimizes for mathematical minimums based on penalties incorporated into the equations implementing the function.

A variety of scoring factors 704 is shown to help distinguish which prospective mappings will help meet optimization targets and which mappings are less ideal, and these scoring factors may be implemented in any suitable way to penalize or incentivize mappings on any suitable basis. For example, optimization function 414 may define the set of scoring factors 704 for use in assigning scores to prospective mappings 702 between silhouette pixels and vertices (i.e., to determine scored mappings 706). The mapping of the set of silhouette pixels to the vertices of the set of vertices may then include selecting from the prospective mappings based on the scores assigned to the prospective mappings (e.g., by mapping selection 708 determining the mapping data 416 to be output based on scored mappings 706). A few specific examples of scoring factors will now be described, but it will be understood that any suitable scoring factors may be employed as may serve a given implementation of optimization function 414.

A first factor included in the set of scoring factors may be configured to penalize large ray lengths between silhouette pixels and vertices in the prospective mappings. As used herein, the "ray length" between a silhouette pixel and a vertex will be understood to refer to the distance or proximity between the silhouette pixel and the vertex when the outline of silhouette pixels is overlaid onto a cross section of vertices (such as shown in FIG. 8). For example, the respective lengths of each of the connecting lines shown in FIG. 8 would be referred to as their ray lengths, and this first factor would score prospective mappings in a manner that would discourage ray lengths from being too long. If this were the only scoring factor taken into account, each silhouette pixel would simply be assigned to its most proximate vertex, a situation illustrated by mappings 802 in FIG. 8 (on the left-hand side of the figure). As shown, while this limited approach may allow for a relatively even distribution of mappings along much of the outline, there may tend to be quite uneven (e.g., "bunched up") mappings at areas where, for example, the silhouette pixels are more or less convex while the cross section of vertices is more or less concave (e.g., around the nape of the neck in this example). As illustrated at vertices 804-1 and 804-2, relatively large numbers of silhouette pixels may be mapped to these vertices since they are the most proximate vertices to all of those silhouette pixels, while various other vertices in a contiguous region 806 (the concave part of the neck) are not mapped to any silhouette pixels.

The uneven distribution of certain mappings 802 (e.g., around vertices 804-1 and 804-2 and region 806) may create undesirable artifacts, as will be described and illustrated in more detail below. As such, additional scoring factors 704 described in more detail below may also be implemented by optimization function 414 to help even out the distribution of mappings, as shown by mappings 808 on the right-hand side of FIG. 8. As shown, mappings 808 are not distributed perfectly evenly (e.g., certain vertices are still mapped to more silhouette pixels than others, etc.), but mappings 808 are clearly optimized and more evenly distributed when compared to mappings 802, particularly in a region 810 of the nape of the neck. In region 810 (and less conspicuously in various other regions of the outline), various mappings 808 are shown to map silhouette pixels to non-proximate vertices to avoid the clustering shown for vertices 804-1 and 804-2 with mappings 802. As will be illustrated below, the more even and optimized distribution of mappings 808 will result in a deformed 3D body model that avoids certain undesirable issues (e.g., unnatural bumps at the back of the head and/or on the shoulders) that may arise from less optimized mapping data such as data representing mappings 802.

Returning to FIG. 7, a variety of additional scoring factors 704 other than the ray-length scoring factor described above (the first factor on which mappings 802 were described as being exclusively based) may be implemented by optimization function 414 to achieve optimized mapping data 416 (such as represented by mappings 808) and to avoid certain issues of less optimized mapping data (such as represented by mappings 802).

One additional example of a scoring factor 704 that may be included in the set of scoring factors may be configured to penalize large distances between vertices mapped to adjacent silhouette pixels in the prospective mappings. For example, in region 806 (the nape of the neck) in FIG. 8, two adjacent silhouette pixels are shown to be mapped to vertices that have a relatively large distance between them. That is, one silhouette pixel is mapped to vertex 804-1 near the bottom of the head and the very next silhouette pixel is mapped to vertex 804-2 in the shoulder area, thereby skipping over a number of vertices of the neck in region 806. This scoring factor would serve to penalize proximity-based mappings in such a situation so that even if (as is the case in this example) neighboring (e.g., adjacent) silhouette pixels are most proximate to vertices that are not themselves adjacent or close neighbors, certain silhouette pixels will be "incentivized" within mapping selection 708 to be mapped to those intermediary (non-proximate) vertices in region 806.

Another example of a scoring factor 704 that may be included in the set of scoring factors may be configured to penalize disparity in cardinalities of silhouette pixels mapped to each of the plurality of vertices in the prospective mappings. As used herein, the "cardinality" of a particular vertex refers to the number of silhouette pixels that is prospectively or actually assigned to that vertex. For example, if mappings 802 in FIG. 8 were all considered to be prospective mappings being assessed and scored by optimization function 414, vertices 804-1 and 804-2 would each be associated with significantly larger cardinalities than vertices neighboring them within the cross section. While vertex 804-1 may be associated with a cardinality of 6 (based on the six silhouette pixels that prospectively map to vertex 804-1), for example, the vertex immediately above it on the head is shown to have a cardinality of only 2 and the vertex immediately below it in region 806 is shown to have a cardinality of zero. Similar to the vertex-distance scoring factor described above, this vertex-cardinality scoring factor 704 would serve to penalize proximity-based mappings in such a situation so that even when (as is the case in this example) large numbers of silhouette pixels happen to be most proximate to a few vertices and no silhouette pixel happens to be most proximate to other vertices, certain silhouette pixels will be "incentivized" within mapping selection 708 to be mapped to those non-proximate vertices in region 806 anyway.

Yet another example of a scoring factor 704 that may be included in the set of scoring factors may be employed in implementations in which silhouette outlines from a plurality of 2D images (e.g., multiple video frames of a video depicting the adorned subject rotating to present a variety of viewpoints, as described above) are mapped to a plurality of corresponding cross sections of the 3D body model (not explicitly shown in FIG. 8). In these implementations, a multi-image consistency scoring factor 704 may be configured to penalize corresponding silhouette pixels of the respective sets of silhouette pixels being mapped to different vertices of the plurality of vertices in the prospective mappings. For example, if a silhouette pixel is mapped to a particular vertex during the mapping of one silhouette outline to one cross section of the 3D body model, this scoring factor may help incentivize corresponding silhouette pixels (e.g., silhouette pixels representing the same or proximate parts of the body or adornments of the adorned subject) to be consistently mapped to the same or similar vertices of the 3D body model.

Along with some or all of the illustrative scoring factors described in detail above, it will be understood that other scoring factors may also or alternatively be employed by optimization function 414 as may serve a particular implementation. For instance, one or more scoring factors may make use of the semantic segmentation of the 2D image and provide penalties and/or incentives for silhouette pixels associated with particular body parts (e.g., the head, the neck, the shoulders, the back, etc.) being mapped to vertices associated with the same body parts of the 3D body model.

Scoring factors 704 may be implemented mathematically, computationally, using machine learning, and/or in any suitable manner or using any suitable technique as may serve a particular implementation. In certain embodiments, for example, different mappings may be created to map silhouette pixel to an intermediate codomain along a circular arc (e.g., a full circle around the outline or a partial arc covering a portion of the outline). Each silhouette pixel may be assigned a theta value in accordance with the angle it aligns to on the arc and the evening out of the distribution may be performed along the length of the arc based on mathematical functions that rely on the theta values (e.g., to give each vertex an approximately equal cardinality, to ensure that each vertex is mapped to at least one silhouette pixel, etc.).

Returning to FIG. 4, mapping data 416 generated by mapping facility 412 in the ways described above (ideally representing optimized mappings more similar to mappings 808 than to mappings 802) is shown to be received by model deformation facility 418. Based on mapping data 416, model deformation facility 418 may be configured perform various operations associated with applying optimization function 420 and generating deformed body model 422. For example, model deformation facility 418 may perform operation 208 of method 200 to define, based on mapping data 416, a set of parameters that will deform 3D body model 402 such that each particular cross section that has been analyzed and mapped (e.g., including cross section 410-1) may conform to a corresponding outline (e.g., including outline 410-2) of the adorned subject formed by silhouette pixels of a particular 2D image (e.g., 2D image 404). Having defined the set of parameters, model deformation facility 418 may then deform 3D body model 402, based on the set of parameters, to thereby generate deformed body model 422, which may simulate (e.g., imitate, represent, look like, etc.) the basic size, and shape of the adorned subject as depicted in the 2D imagery input data (e.g., 2D image 404).

The defining of the set of parameters based on mapping data 416 may be performed in any manner as may serve a particular implementation. Similar to the mapping itself, the parameter definitions may represent a complex problem that does not necessarily have a single right answer, but that can be mathematically and/or computationally optimized (e.g., using optimization function 420, machine learning techniques, etc.) to satisfy a variety of objectives as nearly as possible at the same time. For example, based on the mappings represented by mapping data 416, these objectives may include causing the vertices of the parameterized body model to match or approximate the silhouette pixels mapped to them as nearly as possible.

In some implementations, the parameters by way of which the 3D body model is deformed do not control individual vertices of the 3D body model in a one-to-one manner. For example, no parameter in the set may be configured to individually control a characteristic of a particular vertex or even a particular body part (e.g., there may not be a single parameter that controls "head size" or "shoulder width" directly). Rather, linear combinations of parameters may be defined to control characteristics such as head size, shoulder width, and/or any other suitable aspects of the size, shape, and/or appearance of the deformed 3D body model (e.g., femur length, face shape, hip width, etc.). In certain implementations, the 3D body model may be configured so that each possible combination of parameters results in a deformed 3D body model describing a body that fits within statistical norms for the type of subject being modeled. For instance, there may be a strong statistical correlation between long femurs and long arms (i.e., there are very few individual people who have very long femurs and very short arms), so the parameters for a 3D body model of the human form may be configured such that one parameter influences femur length and arm length in accordance with statistical expectations.

As a result of the parameters functioning in this manner, a change to any given parameter in a set of parameters for a particular 3D body model may affect many or all of the vertices of the body model and it may not be possible or practical to define the parameters so that each vertex perfectly matches any or all of the silhouette pixels to which the vertex is mapped. At the same time, however, there are certainly some definitions for a given set of parameters that will get the vertices closer to matching their silhouette pixels than other definitions. Accordingly, the goal of model deformation facility 418 may be to iteratively steer the set of parameters toward more optimal definitions and away from less optimal definitions.

To this end, optimization function 420 may be applied to facilitate model deformation facility 418 in identifying the most optimal set of parameters that it is able to determine within any constraints (e.g., available computation power, available time, a limited number of iterations, etc.) that may be placed on the system. Optimization function 420 may operate similarly to optimization function 414 described above, but may be configured to help optimize parameter definitions rather than mappings of silhouette pixels to vertices. Specifically, defining the set of parameters may include operations performed by model deformation facility 418 such as: 1) applying an additional optimization function (e.g., optimization function 420) that defines a set of scoring factors used to assign scores to prospective parameters for deforming 3D body model 402 to conform to the outline of the portion of the adorned subject formed by the set of silhouette pixels (e.g., outline 410-2); and 2) selecting from the prospective parameters based on the scores assigned to the prospective parameters.

Figure 9:
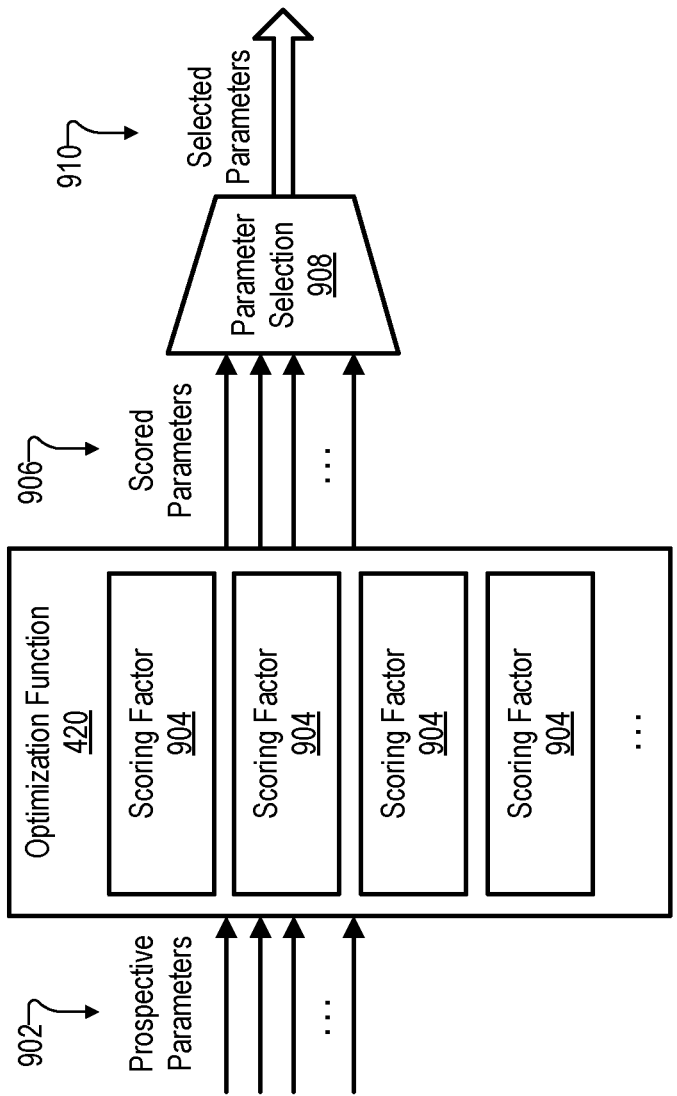
FIG. 9 shows illustrative aspects of how an optimization function may be used to define parameters of a 3D body model to deform the 3D body model to conform to a 2D image of an adorned subject.

To illustrate, FIG. 9 shows example aspects of how optimization function 420 may be used to define the set of parameters for 3D body model 402 to ultimately deform 3D body model 402 to simulate (e.g., conform to, imitate, look like, etc.) 2D imagery depicting an adorned subject (e.g., 2D image 404). Functioning on similar principles as described above for optimization function 414, FIG. 9 shows that prospective parameters 902 are analyzed and assessed by optimization function 420 based on a variety of different scoring factors 904 to determine scored parameters 906 which, when selected and/or filtered by parameter selection 908, ultimately result in a set of selected parameters 910 (the defined set of parameters that will be used to produce deformed body model 422).

Just as a variety of scoring factors 704 were describe above in relation to FIG. 7, scoring factors 904 may be implemented by any suitable scoring factors that may be accounted for to select parameters that will form the basis of a realistic and accurate simulation of the adorned subject. As one example, the set of scoring factors may include a first factor that penalizes prospective parameters that result in large ray lengths between silhouette pixels and vertices to which the silhouette pixels have been mapped. As has been described, this factor would therefore tend to incentive parameters that cause as many vertices as possible to be proximate to the silhouette pixels to which they are mapped (since a short ray length means that the vertex and the silhouette pixel are in close proximity of one another). As another example, the set of scoring factors may include a second factor that penalizes deviation of prospective parameters from default parameters to which the prospective parameters correspond. For instance, the default parameters may be configured to cause the 3D body model to maintain typical features for whatever type of subject the 3D body model represents, so deviations from these norms (e.g., extremely long femurs in combination with short arms or other uncommon or unlikely combinations of parameters) are discouraged by the scoring scheme. This type of parameter may help keep the 3D body model looking natural and like a realistic human subject (or whatever type of subject the model describes) rather than imbuing the deformed model with extreme features that are more likely to be artifacts of the model production process than actual features of the adorned subject being modeled.

Based on selected parameters 910 that are determined in this way (and based on this scoring technique with these and/or other scoring factors 904), model deformation facility 418 may perform the deformation to generate deformed body model 422. This may involve a minimization process that causes the vertices to conform to the deformation targets (e.g., the silhouette pixels). Since this is a one-to-many mapping (i.e., one vertex may map to several silhouette pixels), the minimization accomplished by optimization function 420 may be configured to deform the vertex toward all of its matches while maintaining the smoothness of the mesh, general body shape, and standard shape terms.

Figure 10:
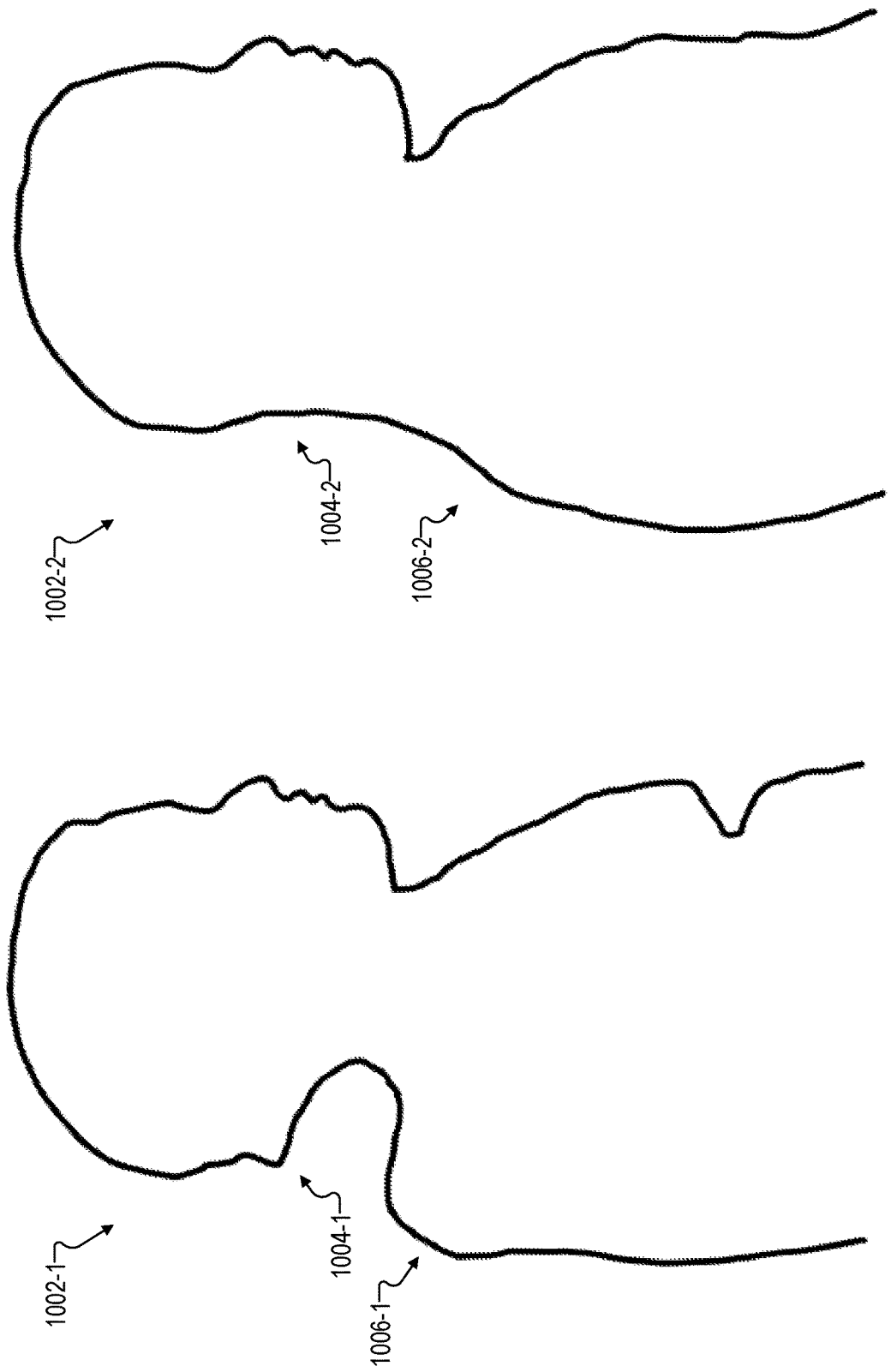
FIG. 10 shows illustrative cross sections of deformed 3D body models generated based on less-optimized and more-optimized mappings of silhouette pixels to vertices.

To illustrate certain aspects of deformed body model 422 and improvements that may result from performing the deformation based on more optimal mappings (e.g., mappings 808) rather than less optimal mappings (e.g., mappings 802) of silhouette pixels to vertices, FIG. 10 shows two illustrative cross sections 1002 (i.e., cross sections 1002-1 and 1002-2) of deformed 3D body models. While FIG. 10 does not illustrate a deformed 3D body model in the same way the initial (not-yet-deformed) 3D body model 402 was illustrated in FIG. 5, cross sections 1002 of differently deformed 3D body models are shown in FIG. 10 to illustrate particular artifacts and features (or lack thereof) that will be understood to result from deformation of 3D body model 402 based on different mappings of silhouette pixels to vertices.

More specifically, a first cross section 1002-1 will be understood to derive from a deformed 3D body model generated based on mappings 802, which, as described above, were suboptimal and included large numbers of silhouette pixels mapped to certain vertices (vertices 804-1 and 804-2) while no silhouette pixels mapped to other vertices (vertices within region 806). As a result of this suboptimal mapping, a feature 1004-1 (i.e., an unnatural looking bump just above the neck where the vertices of region 806 were not mapped to any silhouette pixels) and a feature 1006-1 (i.e., an unnatural looking bump just below the neck where the vertices of region 806 were not mapped to any silhouette pixels) are shown to have originated during the deformation process. This will be understood to have occurred at least in part because 1) the vertices in region 806 (in the nape of the neck) were not mapped to any silhouette pixels that could serve to "pull out" these vertices during the deformation process (i.e., as the parameters were defined by model deformation facility 418), while 2) vertices 804-1 and 804-2 (on either side of region 806) were mapped to an inordinate number of silhouette pixels that served to artificially "pull out" those vertices farther than appears naturally proportional or accurate for that part of the body.

In contrast, a second cross section 1002-2 shown in FIG. 10 will be understood to derive from a deformed 3D body model generated based on mappings 808, which, as described above, were more optimized, based on an application of optimization function 414, to even out the distribution of silhouette pixels mapped to vertices. As a result of this mapping, features 1004-2 and 1006-2, corresponding to where the unnatural bump features 1004-1 and 1006-1 were located in cross section 1002-1, show that the deformed model smoothly and accurately models the transition from the adorned subject's head to her back (including her long hair, bulky clothing, and/or other adornments). This improved result will be understood to have occurred at least in part because vertices 804-1 and 804-2, as well as all the vertices in region 806 (in the nape of the neck), were mapped to similar numbers of silhouette pixels, causing all of the vertices to be "pulled out" in similar and proportional ways during the deformation process (i.e., as the parameters were defined by model deformation facility 418).

Figure 11:
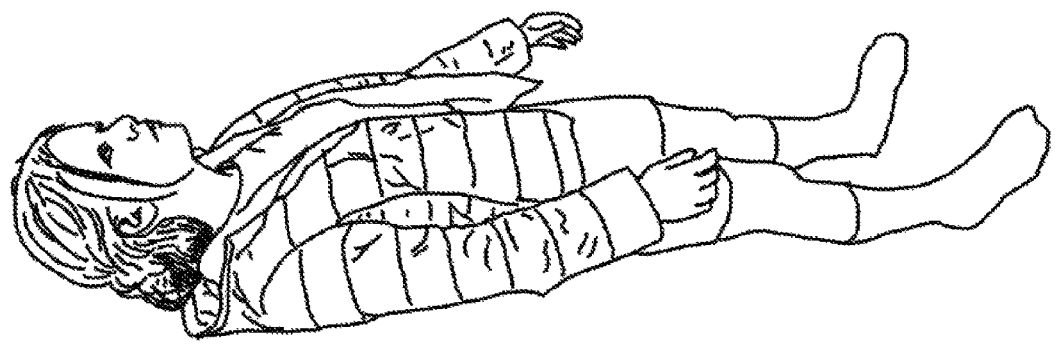
FIG. 11 shows an illustrative volumetric model of an adorned subject generated based on a 2D image of the adorned subject and a deformed 3D body model.

Returning to FIG. 4, deformed body model 422 may be provided by model deformation facility 418 to volumetric modeling facility 424, which may generate volumetric model 426. More particularly, based on deformed 3D body model 422, volumetric modeling facility 424 may generate volumetric model 426 of the adorned subject depicted in 2D image 404. Though volumetric model 426 is based on a 3D body model that was initially unadorned, the mapping and deformation process that the 3D body model has gone through to form deformed body model 422 may cause the volumetric model 426 to incorporate the hair, clothing, and/or other adornments of the adorned subject as depicted in the 2D imagery. To illustrate, FIG. 11 shows an illustrative implementation of volumetric model 426 that models the adorned subject as she appeared in 2D image 404. As shown, from the particular viewpoint illustrated in FIG. 11, volumetric model 426 appears similar or identical to the representation of the adorned subject in 2D image 404. As volumetric model 426 is a fully-manipulable 3D representation of the adorned subject, however, it will be understood that this model may be viewed from any arbitrary viewpoint and may even be manipulated in the ways described herein (or in other suitable ways known in the art for manipulating volumetric 3D models of objects).

Figure 12:
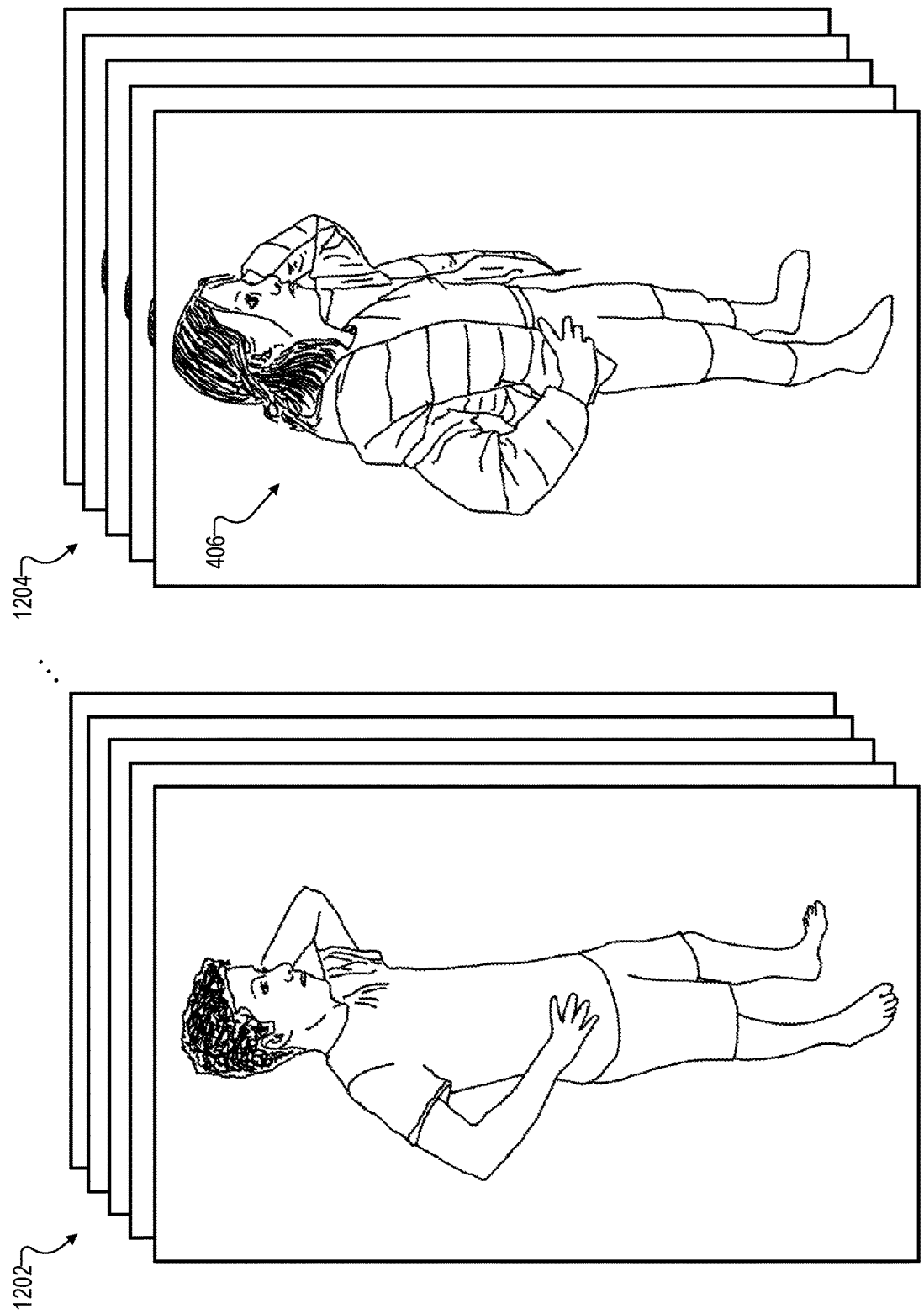
FIG. 12 shows an illustrative presentation of a manipulated volumetric model of an adorned subject.

Indeed, as shown in FIG. 4, volumetric model 426 may be provided by volumetric modeling facility 424 to model manipulation facility 428, where volumetric model 426 may be analyzed, manipulated, and/or used in any suitable way that volumetric 3D models may be used in a particular application or use case. As one example, model manipulation facility 428 may animate volumetric model 426 to cause volumetric model 426 to imitate a movement of a volumetric model of an additional subject different from the adorned subject. FIG. 12 shows an illustrative presentation of a manipulated volumetric model being animated in this way. In FIG. 12, a video 1202 comprising a sequence of video frames shows a different human subject that has been captured in a different pose (e.g., a dance pose, etc.) than the pose of the adorned subject depicted in 2D image 404. Based on video 1202, a video 1204 in which manipulated model 406 is animated to imitate the behavior exhibited in video 1202 (e.g., perform the same dance moves as the other human subject, etc.) may be generated and presented to a user. As has been mentioned, the animating of a volumetric model 426 may be used for various purposes in various types of use cases (e.g., dance applications, stunt simulation, actor replacement for special effects, etc.).

As another example of how volumetric model 426 may be manipulated or used, model manipulation facility 428 may be configured to analyze volumetric model 426 of the adorned subject to determine one or more characteristics of the adorned subject. For example, based on the deformed 3D body model and the resulting volumetric model 426, model manipulation facility 428 may assess the muscle size (and approximate strength) of the adorned subject, the height and approximate weight of the adorned subject, characteristics of the clothing of the adorned subject, and/or other such characteristics associated with the adorned subject. This information could be used to help identify and characterize the subject for a subject recognition system or for other suitable use cases.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 13:
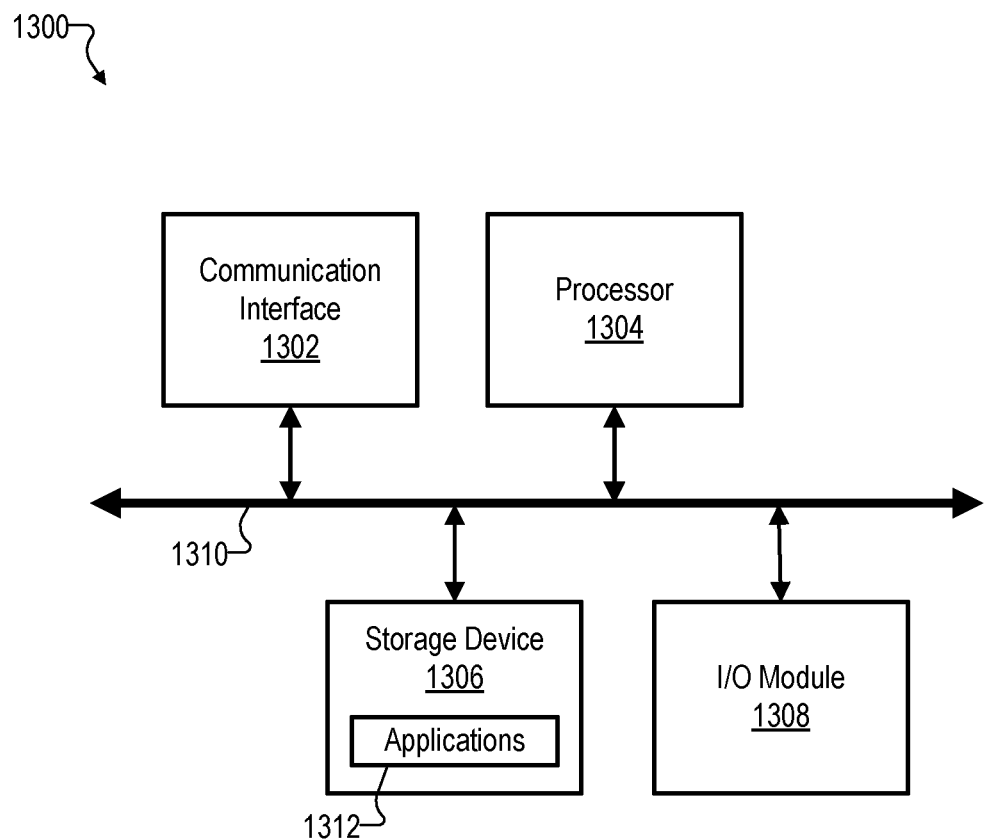
FIG. 13 shows an illustrative computing device that may implement 3D modeling systems and/or other computing systems described herein.

FIG. 13 shows an illustrative computing device 1300 that may implement 3D modeling systems and/or other computing systems described herein. For example, computing device 1300 may include or implement (or partially implement) a 3D modeling system 100, a multi-access compute system such as multi-access compute system 302, a user device such as graphics presentation device 304, certain elements of network 308 and/or image capture devices 310, any other computing devices or systems described herein, and/or any elements or subsystems thereof.

As shown in FIG. 13, computing device 1300 may include a communication interface 1302, a processor 1304, a storage device 1306, and an input/output (I/O) module 1308 communicatively connected via a communication infrastructure 1310. While an illustrative computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may include one or more I/O modules configured to receive user input and provide user output. One or more I/O modules may be used to receive input for a single virtual experience. I/O module 1308 may include any hardware, firmware, software, or combination thereof supportive of input and output capabilities. For example, I/O module 1308 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with processor 104 of system 100. Likewise, memory 102 of system 100 may be implemented by or within storage device 1306.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   accessing a 3D body model bounded by a set of vertices that interconnect to form a shape of an unadorned body, the set of vertices configurable to simulate different subjects based on a set of parameters;
   accessing a 2D image depicting at least a portion of an adorned subject, the portion of the adorned subject outlined in the 2D image by a set of silhouette pixels;
   mapping the set of silhouette pixels outlining the adorned subject to vertices, of the set of vertices, bounding a particular cross section of the 3D body model, wherein the mapping includes applying an optimization function configured to even out a distribution of silhouette pixels to vertices by mapping at least some of the set of silhouette pixels to non-proximate vertices in the set of vertices; and
   based on the mapping, defining the set of parameters to deform the 3D body model such that the particular cross section conforms to an outline of the portion of the adorned subject formed by the set of silhouette pixels.

2. The method of claim 1, wherein:
   the optimization function defines a set of scoring factors used to assign scores to prospective mappings between silhouette pixels and vertices;
   the mapping of the set of silhouette pixels to the vertices of the set of vertices includes selecting from the prospective mappings based on the scores assigned to the prospective mappings; and
   the set of scoring factors includes a factor that penalizes large ray lengths between silhouette pixels and vertices in the prospective mappings.

3. The method of claim 1, wherein:
   the optimization function defines a set of scoring factors used to assign scores to prospective mappings between silhouette pixels and vertices;
   the mapping of the set of silhouette pixels to the vertices of the set of vertices includes selecting from the prospective mappings based on the scores assigned to the prospective mappings; and
   the set of scoring factors includes a factor that penalizes large distances between vertices mapped to adjacent silhouette pixels in the prospective mappings.

4. The method of claim 1, wherein:
   the optimization function defines a set of scoring factors used to assign scores to prospective mappings between silhouette pixels and vertices;

the mapping of the set of silhouette pixels to the vertices of the set of vertices includes selecting from the prospective mappings based on the scores assigned to the prospective mappings; and the set of scoring factors includes a factor that penalizes disparity in cardinalities of silhouette pixels mapped to different vertices in the prospective mappings.

5. The method of claim 1, wherein:

the 2D image is a particular video frame from a video depicting the adorned subject rotating to present a variety of viewpoints of the adorned subject;

the method further comprises:

accessing additional video frames of the video, the additional video frames depicting the adorned subject from the variety of viewpoints, and mapping respective sets of silhouette pixels from the additional video frames to the vertices of the set of vertices of the 3D body model based on the optimization function; and the defining of the set of parameters is further based on the mapping of the respective sets of silhouette pixels from the additional video frames to the vertices.

6. The method of claim 5, wherein:

the optimization function defines a set of scoring factors used to assign scores to prospective mappings between silhouette pixels and vertices;

the mapping of the set of silhouette pixels to the vertices of the set of vertices includes selecting from the prospective mappings based on the scores assigned to the prospective mappings; and the set of scoring factors includes a factor that penalizes corresponding silhouette pixels of the respective sets of silhouette pixels being mapped to different vertices in the prospective mappings.

7. The method of claim 1, wherein:

the defining of the set of parameters includes:

applying an additional optimization function that defines a set of scoring factors used to assign scores to prospective parameters for deforming the 3D body model to conform to the outline of the portion of the adorned subject formed by the set of silhouette pixels, and selecting from the prospective parameters based on the scores assigned to the prospective parameters; and the set of scoring factors includes:

a first factor that penalizes prospective parameters that result in large ray lengths between silhouette pixels and vertices to which the silhouette pixels have been mapped, and a second factor that penalizes deviation of prospective parameters from default parameters to which the prospective parameters correspond.

8. The method of claim 1, further comprising:

deforming the 3D body model based on the set of parameters; and generating, based on the deformed 3D body model, a volumetric model of the adorned subject, the volumetric model incorporating at least one of hair or clothing for the adorned subject.

9. The method of claim 8, further comprising animating the volumetric model of the adorned subject to cause the volumetric model to imitate a movement of a volumetric model of an additional subject different from the adorned subject.

10. The method of claim 8, further comprising analyzing the volumetric model of the adorned subject to determine one or more characteristics of the adorned subject.

11. The method of claim 1, wherein the accessing of the 3D body model includes selecting the 3D body model from a plurality of available body model templates, the selecting performed based on at least one of user input or the 2D image.

12. A system comprising:

a memory storing instructions; and one or more processors communicatively coupled to the memory and configured to execute the instructions to perform a process comprising:

accessing a 3D body model bounded by a set of vertices that interconnect to form a shape of an unadorned body, the set of vertices configurable to simulate different subjects based on a set of parameters;

accessing a 2D image depicting at least a portion of an adorned subject, the portion of the adorned subject outlined in the 2D image by a set of silhouette pixels;

mapping the set of silhouette pixels outlining the adorned subject to vertices, of the set of vertices, bounding a particular cross section of the 3D body model, wherein the mapping includes applying an optimization function configured to even out a distribution of silhouette pixels to vertices by mapping at least some of the set of silhouette pixels to non-proximate vertices in the set of vertices; and based on the mapping, defining the set of parameters to deform the 3D body model such that the particular cross section conforms to an outline of the portion of the adorned subject formed by the set of silhouette pixels.

13. The system of claim 12, wherein:

the optimization function defines a set of scoring factors used to assign scores to prospective mappings between silhouette pixels and vertices;

the mapping of the set of silhouette pixels to the vertices of the set of vertices includes selecting from the prospective mappings based on the scores assigned to the prospective mappings; and the set of scoring factors includes a factor that penalizes large ray lengths between silhouette pixels and vertices in the prospective mappings.

14. The system of claim 12, wherein:

the optimization function defines a set of scoring factors used to assign scores to prospective mappings between silhouette pixels and vertices;

the mapping of the set of silhouette pixels to the vertices of the set of vertices includes selecting from the prospective mappings based on the scores assigned to the prospective mappings; and the set of scoring factors includes a factor that penalizes large distances between vertices mapped to adjacent silhouette pixels in the prospective mappings.

15. The system of claim 12, wherein:

the optimization function defines a set of scoring factors used to assign scores to prospective mappings between silhouette pixels and vertices;

the mapping of the set of silhouette pixels to the vertices of the set of vertices includes selecting from the prospective mappings based on the scores assigned to the prospective mappings; and the set of scoring factors includes a factor that penalizes disparity in cardinalities of silhouette pixels mapped to each of the vertices in the prospective mappings.

16. The system of claim 12, wherein:

the 2D image is a particular video frame from a video depicting the adorned subject rotating to present a variety of viewpoints of the adorned subject;

the process further comprises:
  accessing additional video frames of the video, the additional video frames depicting the adorned subject from the variety of viewpoints, and
  mapping respective sets of silhouette pixels from the additional video frames to the vertices of the set of vertices of the 3D body model based on the optimization function; and
the defining of the set of parameters is further based on the mapping of the respective sets of silhouette pixels from the additional video frames to the vertices.

17. The system of claim 12, wherein the process further comprises:
  deforming the 3D body model based on the set of parameters; and
  generating, based on the deformed 3D body model, a volumetric model of the adorned subject, the volumetric model incorporating at least one of hair or clothing for the adorned subject.

18. The system of claim 17, wherein the process further comprises at least one of:
  animating the volumetric model of the adorned subject to cause the volumetric model to imitate a movement of a volumetric model of an additional subject different from the adorned subject; or
  analyzing the volumetric model of the adorned subject to determine one or more characteristics of the adorned subject.

19. The system of claim 12, wherein the accessing of the 3D body model includes selecting the 3D body model from a plurality of available body model templates, the selecting performed based on at least one of user input or the 2D image.

20. A non-transitory computer-readable medium storing instructions that, when executed, direct a processor of a computing device to perform a process comprising:
  accessing a 3D body model bounded by a set of vertices that interconnect to form a shape of an unadorned body, the set of vertices configurable to simulate different subjects based on a set of parameters;
  accessing a 2D image depicting at least a portion of an adorned subject, the portion of the adorned subject outlined in the 2D image by a set of silhouette pixels;
  mapping the set of silhouette pixels outlining the adorned subject to vertices, of the set of vertices, bounding a particular cross section of the 3D body model, wherein the mapping includes applying an optimization function configured to even out a distribution of silhouette pixels to vertices by mapping at least some of the set of silhouette pixels to non-proximate vertices in the set of vertices; and
  based on the mapping, defining the set of parameters to deform the 3D body model such that the particular cross section conforms to an outline of the portion of the adorned subject formed by the set of silhouette pixels.

* * * * *